(12) United States Patent
Itoh et al.

(10) Patent No.: US 11,328,451 B2
(45) Date of Patent: May 10, 2022

(54) IMAGE DECODING APPARATUS AND IMAGE CODING APPARATUS

(71) Applicant: SHARP KABUSHIKI KAISHA, Sakai (JP)

(72) Inventors: Norio Itoh, Sakai (JP); Tomohiro Ikai, Sakai (JP); Takeshi Chujoh, Sakai (JP); Tomonori Hashimoto, Sakai (JP); Eiichi Sasaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 72 days.

(21) Appl. No.: 16/812,863

(22) Filed: Mar. 9, 2020

(65) Prior Publication Data

US 2020/0294272 A1   Sep. 17, 2020

(30) Foreign Application Priority Data

Mar. 15, 2019   (JP) .............................. JP2019-049005

(51) Int. Cl.
*G06T 9/00* (2006.01)
*G06T 7/10* (2017.01)
*G06N 3/04* (2006.01)
*G06T 3/40* (2006.01)

(52) U.S. Cl.
CPC .......... *G06T 9/002* (2013.01); *G06N 3/0454* (2013.01); *G06T 3/4053* (2013.01); *G06T 7/10* (2017.01)

(58) Field of Classification Search
CPC ......... G06T 9/002; G06T 7/10; G06T 3/4053; G06N 3/0454; H04N 19/70; H04N 19/85; H04N 19/91; H04N 19/96; H04N 19/82; H04N 19/44; H04N 19/124; H04N 19/625; H04N 19/159
See application file for complete search history.

(56) References Cited

U.S. PATENT DOCUMENTS

| | | | |
|---|---|---|---|
| 10,593,028 B2 * | 3/2020 | Najaf-Zadeh | G06T 15/205 |
| 2011/0211636 A1 | 9/2011 | Tamada et al. | |
| 2015/0215622 A1 * | 7/2015 | Pomianowski | H04N 19/46 382/233 |
| 2016/0117574 A1 * | 4/2016 | Mei | G06F 16/5838 382/159 |
| 2019/0045269 A1 * | 2/2019 | Fujimori | H04N 21/440245 |

(Continued)

FOREIGN PATENT DOCUMENTS

| | | | | |
|---|---|---|---|---|
| CN | 102210151 A | 10/2011 | | |
| KR | 20180105690 A * | 9/2018 | ..... | H04N 21/440245 |

OTHER PUBLICATIONS

Variational Auto-Decoder: A Method for Neural Generative Modeling from Incomplete Data AZadeh, YC Lim, PP Liang, LP Morency—arXiv preprint arXiv: 1903.00840, 2019—arxiv.org (Year: 2019).*

(Continued)

*Primary Examiner* — Charles T Shedrick
(74) *Attorney, Agent, or Firm* — ScienBiziP, P.C.

(57) ABSTRACT

An image decoding apparatus includes a decoding unit configured to decode coded data into a decoded image and segmentation metadata, a segmentation metadata decoding unit configured to generate segmentation information, and an image processing unit configured to perform prescribed image processing on the decoded image with reference to the segmentation information.

3 Claims, 27 Drawing Sheets

(56) References Cited

U.S. PATENT DOCUMENTS

2020/0013168 A1\* 1/2020 Seshita .................. G06T 17/00
2020/0099954 A1\* 3/2020 Hemmer .............. H04N 19/186
2020/0104325 A1\* 4/2020 Keskar ................ G06N 3/0454
2021/0272293 A1\* 9/2021 Ooishi ................ H04N 19/132

OTHER PUBLICATIONS

Jianle Chen et al.: "Algorithm Description of Joint Exploration Test Model 7 (JEM 7)", JVE1-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.

\* cited by examiner

| Segmentation_meta_data( payloadSize ) { | Descriptor |
|---|---|
| width | ue(v) |
| height | ue(v) |
| channel | ue(v) |
| for (i=0; i<height; i++) | |
|     for(j=0; j<width; j++) | |
|         for(k=0; k<channel; k++) | |
|             meta_data[i][j][k] | se(v) |
| } | |

FIG. 11

IMAGE DECODING APPARATUS AND IMAGE CODING APPARATUS

CROSS-REFERENCE TO RELATED APPLICATIONS

This application claims the benefit of priority to Japanese Patent Application Number 2019-049005 filed on Mar. 15, 2019. The entire contents of the above-identified application are hereby incorporated by reference.

BACKGROUND

Technical Field

An embodiment of the disclosure relates to an image decoding apparatus and an image ceding apparatus.

A video coding apparatus which generates coded data by coding a video, and a video decoding apparatus which generates decoded images by decoding the coded data are used to transmit or record a video efficiently.

For example, specific video coding schemes include methods suggested in H.264/AVC and High-Efficiency Video Coding (HEVC).

In such a video coding scheme, images (pictures) constituting a video are managed by a hierarchy structure including slices obtained by splitting the images, Coding Tree Units (CTUs) obtained by splitting the slices, coding units (also sometimes referred to as Coding Units (CUs)) obtained by splitting the coding tree units, and Transform Units (TUs) obtained by splitting the coding units, and are coded/decoded for each CU.

In such a video coding scheme, usually, a prediction image is generated based on local decoded images obtained by coding/decoding input images, and prediction errors (also sometimes referred to as "difference images" or "residual images") obtained by subtracting the prediction images from input images (original image) are coded. Generation methods of prediction images include an inter-picture prediction (an inter prediction) and an intra-picture prediction (intra prediction).

Further, as a video coding and decoding technology of recent years, there is "Algorithm Description of Joint Exploration Test Model 7", JVET-G1001, Joint video Exploration Team (JVET) of ITU-T SG 16 WP 3 and ISO/IEC JTC 1/SC 29/WG 11, Aug. 19, 2017.

SUMMARY

For an image decoding apparatus to more preferably perform image processing of a decoded image to be decoded, there is room for improvement in an image decoding apparatus and an image coding apparatus of related art as described above.

The disclosure is made in view of the problem described above, and has an object to realize an image decoding apparatus and an image coding apparatus that enable the image decoding apparatus to preferably perform image processing.

To solve the problem described above, an image decoding apparatus according to one aspect of the disclosure includes: a decoding unit configured to decode coded data into a decoded image and segmentation metadata; a segmentation metadata decoding unit configured to generate segmentation information with reference to the segmentation metadata resulting from decoding by the decoding unit; and an image processing unit configured to perform prescribed image processing on the decoded image with reference to the segmentation information.

To solve the problem described above, an image decoding apparatus according to one aspect of the disclosure includes: a decoding unit configured to decode coded data into a decoded image and super-resolution metadata used for super-resolution processing; and a super-resolution unit configured to generate a super-resolution image by performing the super-resolution processing on the decoded image with reference to the super-resolution metadata.

To solve the problem described above, an image decoding apparatus according to one aspect of the disclosure includes: a decoding unit configured to decode coded data into a decoded image and super-resolution metadata; and an autoencoder configured to receive input of the decoded image and the super-resolution metadata, and output a super-resolution image.

To solve the problem described above, an image coding apparatus according to one aspect of the disclosure includes: an image processing unit configured to generate a processed image by performing prescribed image processing on an input image; an encoder configured to generate coded data by coding the processed image; and a segmentation metadata generation unit configured to generate segmentation metadata with reference to the input image, wherein the encoder includes the segmentation metadata in the coded data.

To solve the problem described above, an image coding apparatus according to one aspect, of the disclosure includes: an image reduction unit configured to generate a reduced image by performing image reduction processing on an input image; an encoder configured to generate coded data by coding the reduced image; and a super-resolution metadata generation unit configured to generate super-resolution metadata with reference to a local decoded image and the input image, wherein the encoder includes the super-resolution metadata in the coded data.

To solve the problem described above, an image coding apparatus according to one aspect of the disclosure includes: an image reduction unit configured to generate a reduced image by performing image reduction processing on an input image; an encoder configured to generate coded data by coding the reduced image; and an autoencoder configured to operate on the input image, wherein the encoder includes output data of the autoencoder in the coded data.

According to one aspect of the disclosure, an image decoding apparatus and an image coding apparatus that enable the image decoding apparatus to preferably perform image processing can be realized.

BRIEF DESCRIPTION OF DRAWINGS

The disclosure will be described with reference to the accompanying drawings, wherein like numbers reference like elements.

FIG. 11 is a diagram illustrating syntax included in the segmentation metadata.

DESCRIPTION OF EMBODIMENTS

Embodiment

Hereinafter, embodiments of the disclosure are described with reference to the drawings.

Figure 1:
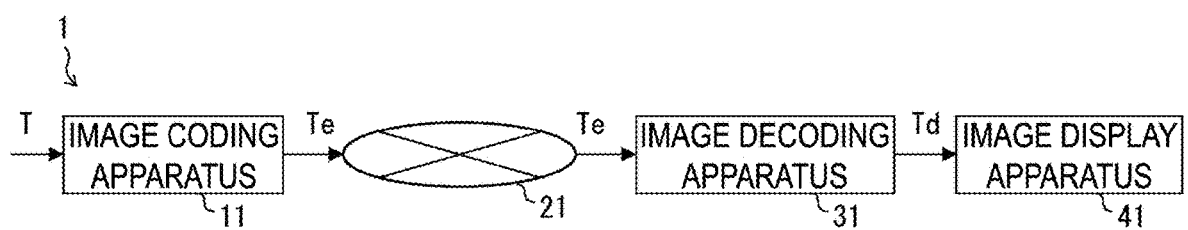
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system configured to transmit coding streams of a coding target image having been coded, decode the transmitted coding streams, and display an image. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD: trade name) and Blue-ray Disc (BD: trade name).

The video decoding apparatus 31 decodes each of the coding streams Te transmitted by the network 21, and generates one or multiple decoded images Td. The video decoding apparatus 31 generates one or multiple processed images (super-resolution images) Tr with reference to the one or multiple generated decoded images Td.

The video display apparatus 41 displays all or a part of the one or multiple decoded images Td or one or multiple processed images Tr generated by the video decoding apparatus 31. For example, the video display apparatus 41 includes a display device such as a liquid crystal display and an organic Electroluminescence (EL) display. The display may be in the form of a stationary display, a mobile display, and an HMD, for example. In a case that the video decoding apparatus 31 has high processing capability, the video decoding apparatus 31 displays an image of high image quality, whereas in a case that the video decoding apparatus 31 has only lower processing capability, the video decoding apparatus 31 displays an image that does not require high processing capability or display capability.

Operator

Operators used herein will be described below.

» represents a right bit shift, « represents a left bit shift, & represents a bitwise AND, | represents a bitwise OR, |= represents an OR assignment operator, and || represents a logical sum.

x?y:z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

abs(a) is a function that returns an absolute value of a.

Int(a) is a function that returns an integer value of a.

floor(a) is a function that returns a maximum integer equal to or less than a.

ceil(a) is a function that returns a maximum integer equal to or greater than a.

a/d represents division of a by d (round down the decimal places).

Structure of Coding Stream Te

Prior to the detailed description of the video coding apparatus 11 and the video decoding apparatus 31 according to the present embodiment, the data structure of the coding stream Te generated by the video coding apparatus 11 and decoded by the video decoding apparatus 31 will be described.

Figure 4:
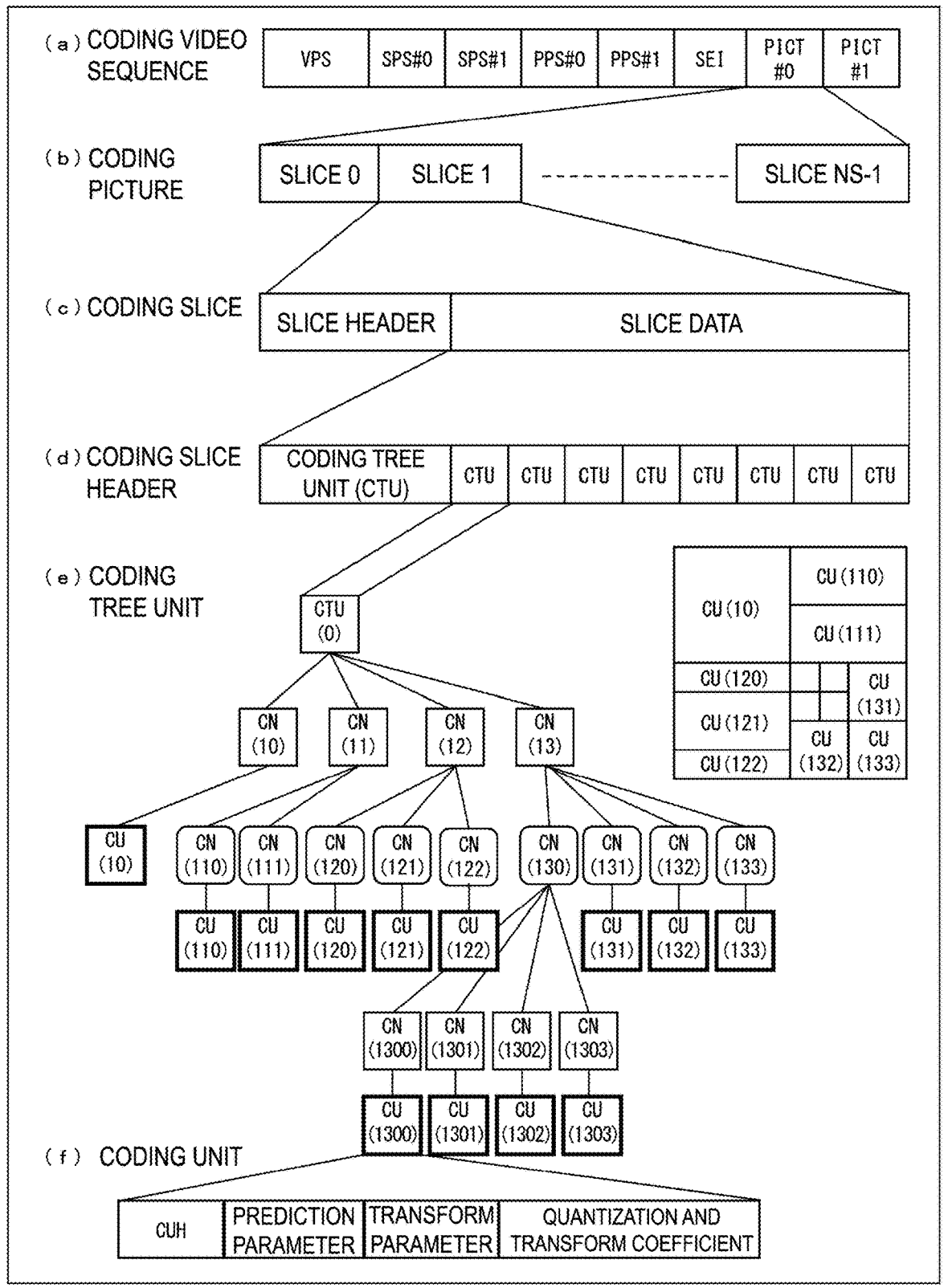
FIG. 4 is a diagram illustrating a hierarchy structure of data of a coding stream.

FIG. 4 is a diagram illustrating a hierarchy structure of data in the coding stream Te. The coding stream Te includes a sequence and multiple pictures constituting a sequence illustratively, (a) to (f) of FIG. 4 are diagrams illustrating a coding video sequence prescribing a sequence SEQ, a coding picture prescribing a picture PICT, a coding slice prescribing a slice S, a coding slice data prescribing slice data, a coding tree unit included in coding slice data, and coding units included in a coding tree unit, respectively.

Coding Video Sequence

In the coding video sequence, a set of data referred to by the video decoding apparatus 31 to decode the sequence SEQ of a processing target is prescribed. As illustrated in FIG. 4(a), the sequence SEQ includes a Video Parameter Set, a Sequence Parameter Set SPS, a Picture Parameter Set PPS, a picture PICT, and Supplemental Enhancement Information SEI.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the video decoding apparatus 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the video decoding apparatus 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the video decoding apparatus 31 to decode the picture PICT of a processing target is prescribed. As illustrated in FIG. 4(b), the picture PICT includes slice 0 to slice NS−1 (NS is the total number of slices included in the picture PICT).

Note that in a case that slice 0 to slice NS−1 need not be distinguished from one another in the following description, a subscript/superscript of reference signs may be omitted in description. The same applies to ether data included in the coding stream Te described below and described with an added subscript/superscript.

Coding Slice

In the coding slice, a set of data referred to by the video decoding apparatus 31 to decode the slice S of a processing target is prescribed. As illustrated in FIG. 4(c), the slice includes a slice header and slice data.

The slice header includes a coding parameter group referred to by the video decoding apparatus 31 to determine a decoding method of a target slice. Slice type specification information (slice_type) to specify a slice type is one example of a coding parameter included in the slice header.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding. Note that an inter prediction is not limited to uni-prediction and bi-prediction, and a prediction image may be generated by using a larger number of reference pictures. The term "P or B slice" as used hereinafter refers to a slice including a block to which an inter prediction can be used.

Note that the slice header may include a reference (pic_parameter_set_id) to the picture parameter set PPS.

Coding Slice Data

In the coding slice data, a set of data referred to by the video decoding apparatus 31 to decode the slice data of a processing target is prescribed. As illustrated in FIG. 4(d), the slice data includes a CTU. The CTC is a block of a fixed size (for example, 64×64) constituting a slice, and may be referred to as a Largest Coding Unit (LCU).

Coding Tree Unit

In FIG. 4(e), a set of data referred to by the video decoding apparatus 31 to decode the CTU of a processing target is prescribed. The CTU is split by a recursive Quad Tree split (QT split), Binary Tree split (BT split), or Ternary Tree split (TT split), and is thereby split into coding units CU, each of which is a basic unit of coding processing. The BT split and the TT split are collectively referred to as a Multi Tree split (MT split). Nodes of a tree structure obtained by recursive quad tree splits are referred to as Coding Nodes. Intermediate nodes of the quad tree, binary tree, and the ternary tree are coding nodes, and the CTU itself is also prescribed as the highest coding node.

As CT information, the CT includes a QT split flag (cu_split_flag) indicating whether or not to perform a QT split, an MT split flag (split_mt_flag) indicating whether or not there is an MT split, an MT split direction (split_mt_dir) indicating a split direction of an MT split, and an MT split type (split_mt_type) indicating a split type of an MT split. cu_split_flag, split_mt_flag, split_mt_dir, and split_mt_type are transmitted for each coding node.

Figure 5:
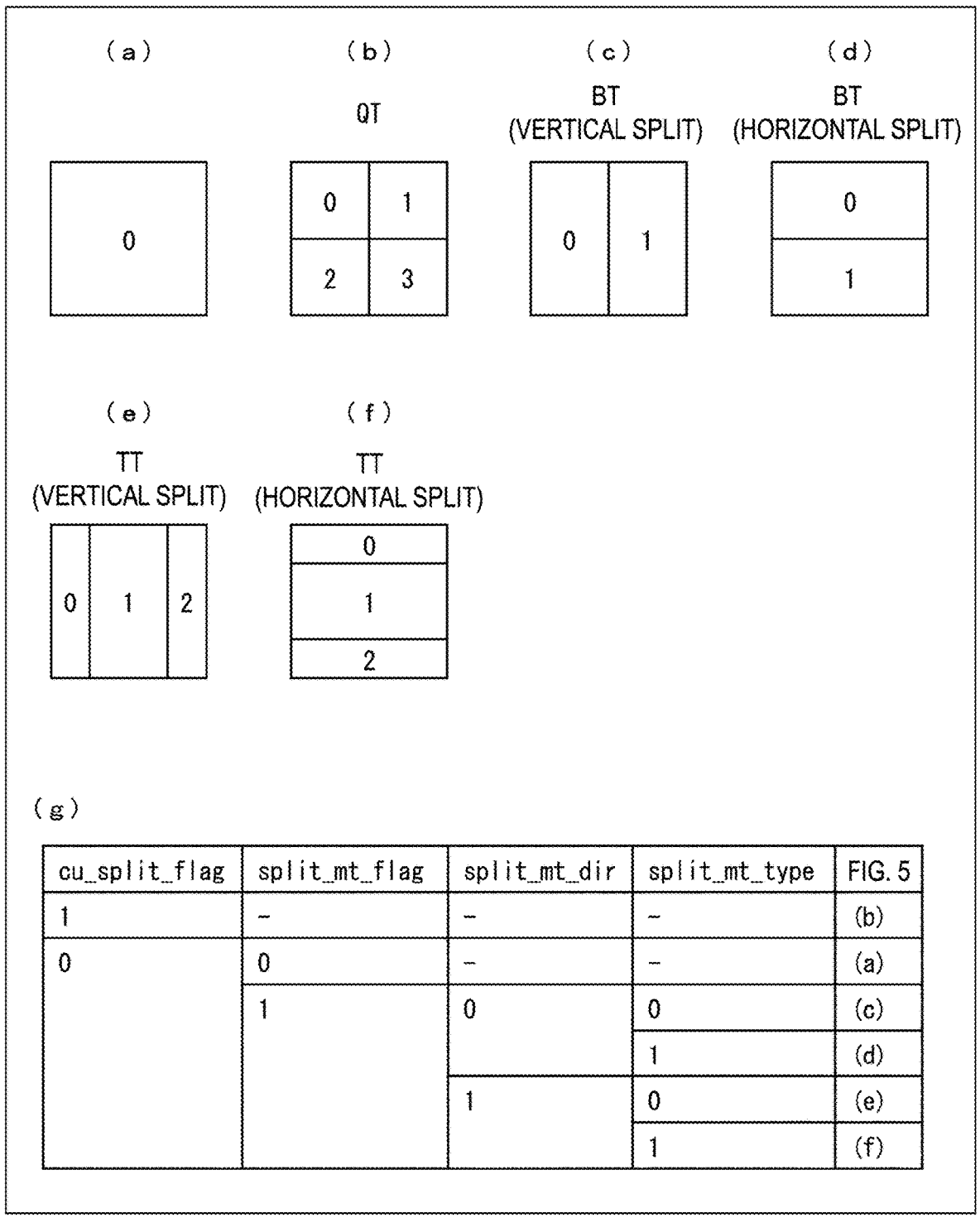
FIG. 5 is a diagram illustrating split examples of a CTU.

In a case that cu_split_flag is 1, the coding node is split into four coding nodes (FIG. 5(b)).

In a case that cu_split_flag is 0 and split_mt_flag is 0, the coding node is not split, and there is one CU as a node (FIG.

5(a)). The CU is a terminal node of the coding node, and is not split anymore. The CU is a basic unit of coding processing.

In a case that split_mt_flag is 1, the coding node is split by the MT split as follows. In split_mt_type being 0. In a case that split_mt__dir is 1, the coding node is horizontally split into two coding nodes (FIG. 5(d)), and in a case that split_mt_dir is 0, the coding node is vertically split into two coding nodes (FIG. 5(c)). In split_mt_type being 1, in a case that split_mt_dir is 1, the coding node is horizontally split into three coding nodes (FIG. 5(f)), and in a case that split_mt_dir is 0, the coding node is vertically split into three coding nodes (FIG. 5(e)). Such splits are illustrated in FIG. 5(g).

In a case that the size of the CTU is 64×64 pixels, the size of the CU may be any of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in FIG. 4(f), a set of data referred to by the video decoding apparatus 31 to decode the coding unit of a processing target is prescribed. Specifically, the CU includes a CU header CUH, a prediction parameter, a transform parameter, and a quantization and transform coefficient, for example. In the CU header, a prediction mode or the like is prescribed.

Prediction processing may be performed for each CU, or may be performed for each sub-CU, which is obtained by further splitting the CU. In a case that the CU and the sub-CU have the same size, there is one sub-CU included in the CU. In a case that the CU has a size larger than the size of the sub-CU, the CU is split into sub-CUs. For example, in a case that the CU is 8×8 and the sub-CU is 4×4, the CU is split into four sub-CUs with two horizontal splits and two vertical splits.

There are two prediction types (prediction modes), which are an intra prediction and an inter prediction. The intra prediction is a prediction in an identical picture, and the inter prediction refers to a prediction processing performed between mutually different pictures (for example, between display times, and between layer images).

Transform and quantization processing is performed for each CU. The quantization and transform coefficient may be subjected to entropy coding for each sub-block of 4×4, for example.

Prediction Parameter

The prediction image is derived by a prediction parameter associated with the block. The prediction parameter includes prediction parameters for the intra prediction and the inter prediction.

Configuration Example 1 of Video Decoding Apparatus

Figure 6:
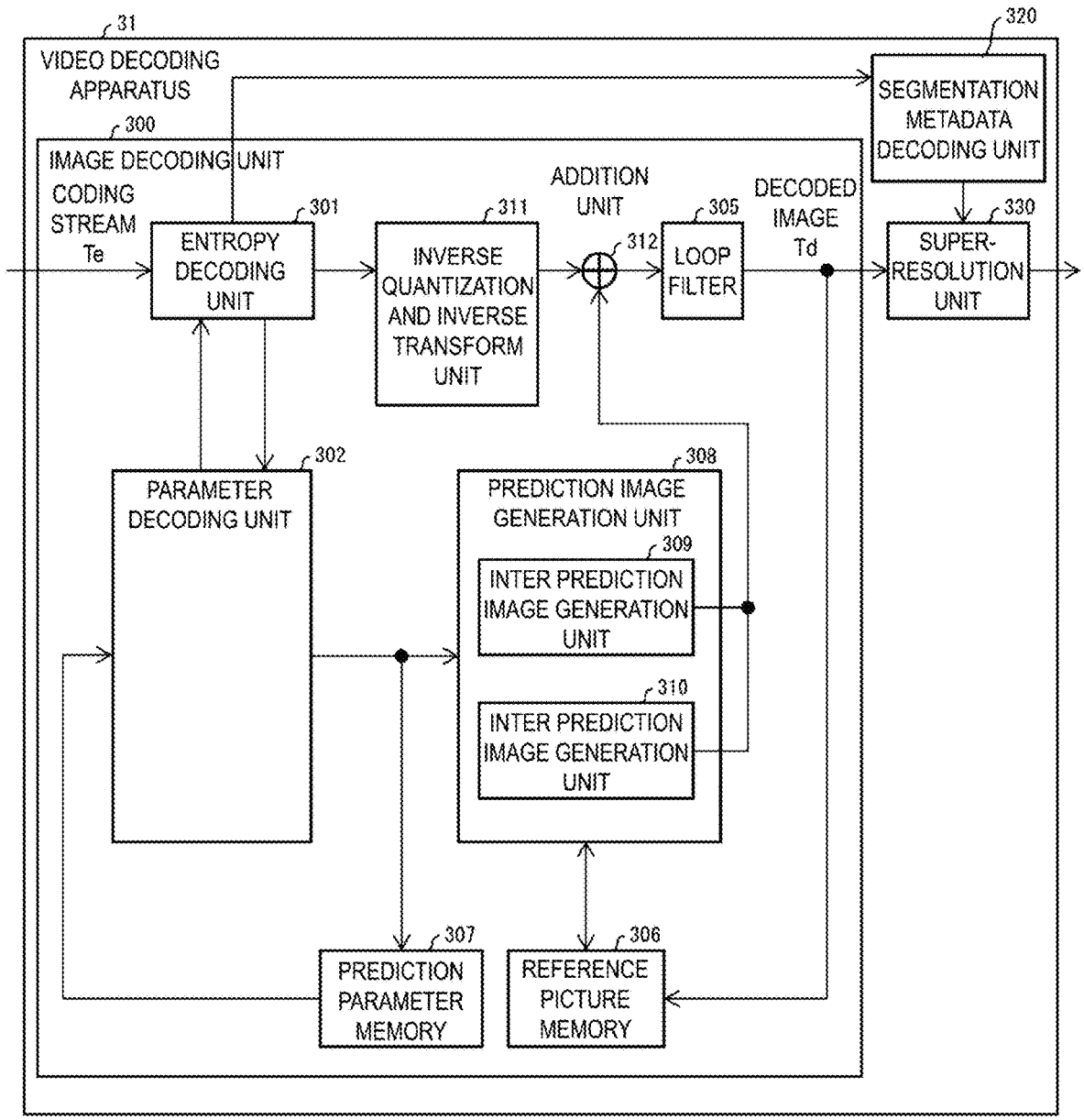
FIG. 6 is a functional block diagram illustrating a configuration of the video decoding apparatus according to the present embodiment.

A configuration of the video decoding apparatus 31 (FIG. 6) according to the present embodiment will be described.

The video decoding apparatus 31 includes an image decoding unit (decoding unit) 300, a segmentation metadata decoding unit 320, and a super-resolution unit (image processing unit) 330.

The image decoding unit 300 acquires the coding stream (coded data) Te from an entropy decoding unit 301 of the image decoding unit 300, and decodes the acquired coding stream Te to obtain the decoded image Td and segmentation metadata Tsm. The image decoding unit 300 includes an entropy decoding unit 301, a parameter decoding unit (prediction image decoding apparatus) 302, a loop filter 305, a reference picture memory 306, a prediction parameter memory 307, a prediction image generation unit (prediction image generation apparatus) 308, an inverse quantization and inverse transform unit 311, and an addition unit 312. Note that, in accordance with the video coding apparatus 11 to be described later, the video decoding apparatus 31 may have a configuration not including the loop filter 305.

The parameter decoding unit 302 includes an inter prediction parameter decoding unit 303 and an intra prediction parameter decoding unit 304, which are not illustrated. The prediction image generation unit 308 includes an inter prediction image generation unit 309 and an intra prediction image generation unit 310.

Although the following describes an example using the CTU and the CU as a unit of processing, this example is not restrictive. Processing may be performed for each sub-CU. Alternatively, processing may be performed for each block or sub-block, with the CTU and the CU being interpreted as the block and the sub-CU as the sub-block.

The entropy decoding unit 301 performs entropy decoding on the coding stream Te input from the outside, and separates and decodes individual codes (syntax elements). The entropy coding includes a method of performing variable length coding on syntax elements by using a context (probability model) adaptively selected according to a type of a syntax element and a surrounding condition, and a method of performing variable length coding on syntax elements by using a predetermined table or a calculation formula. In Context Adaptive Binary Arithmetic Coding (CABAC) as the former method, probability models updated for each coded or decoded picture (slice) is stored in the memory. Then, as an initial state of the context of P picture or B picture, a probability model of the picture using a quantization parameter of the same slice type or the same slice level is set from among the probability models stored in the memory. The initial state is used in coding and decoding processing. Separated codes include prediction information to generate a prediction image and prediction errors to generate a differential image, for example.

The entropy decoding unit 301 outputs the separated codes to the parameter decoding unit 302. For example, the separated codes include a prediction mode predMode, a merge flag merge_flag, a merge index merge__idx, an inter prediction indicator inter_pred_idc, a reference picture index refIdxLX, a prediction vector index mvp_LX__idx, and a difference vector mvdLX, for example. The control of which code to decode is performed based on an indication of the parameter decoding unit 302. The entropy decoding unit 301 outputs the coding stream Te including the segmentation metadata Tsm to the segmentation metadata decoding unit 320.

The loop filter 305 is a filter provided in a coding loop, and is a filter that removes block distortion and ringing distortion to improve image quality. The loop filter 305 applies a filter such as a deblocking filter, a sample adaptive offset (SAO), and an adaptive loop filter (ALF) on a decoded image of a CU generated by the addition unit 312.

The reference picture memory 306 stores a decoded image of a CU generated by the addition unit 312 at a position predetermined for each target picture and target CU.

The prediction parameter memory 307 stores the prediction parameter at a position predetermined for each CTU or CU as a decoding target. Specifically, the prediction parameter memory 307 stores the parameter decoded by the parameter decoding unit 302 and the prediction mode predMode separated by the entropy decoding unit 301, for example.

The prediction image generation unit 308 receives input of the prediction mode predMode and the prediction parameter, for example. The prediction image generation unit 308 reads a reference picture from the reference picture memory 306. The prediction image generation unit 308 generates the prediction image of the block or the sub-block by using the prediction parameter and the read reference picture (reference picture block) in the prediction mode indicated by the prediction mode predMode. Here, the reference picture block is a set of pixels on the reference picture (the reference picture block usually has a rectangular shape, hence is referred to as "block"), and is a region referred to for generating the prediction image.

The inverse quantization and inverse transform unit 311 performs inverse quantization on quantization and transform coefficients input from the entropy decoding unit 301 and calculates transform coefficients. The quantization and transform coefficients are coefficients obtained by performing frequency transform such as Discrete Cosine Transform (DCT), Discrete Sine Transform (DST), and Karhunen Loeve Transform (KLT) on prediction errors to perform quantization in the coding processing. The inverse quantization and inverse transform unit 311 performs inverse frequency transform such as inverse DCT, inverse DST, and inverse KLT on the calculated transform coefficients, and calculates the prediction errors. The inverse quantization and inverse transform unit 311 outputs the prediction errors to the addition unit 312.

The addition unit 312 adds the prediction image of the block input from the prediction image generation unit 308 and the prediction errors input from the inverse quantization and inverse transform unit 311 for each pixel, and generates the decoded image of the block. The addition unit 312 stores the decoded image of the block in the reference picture memory 306, and also outputs the decoded image to the loop filter 205.

Figure 7:
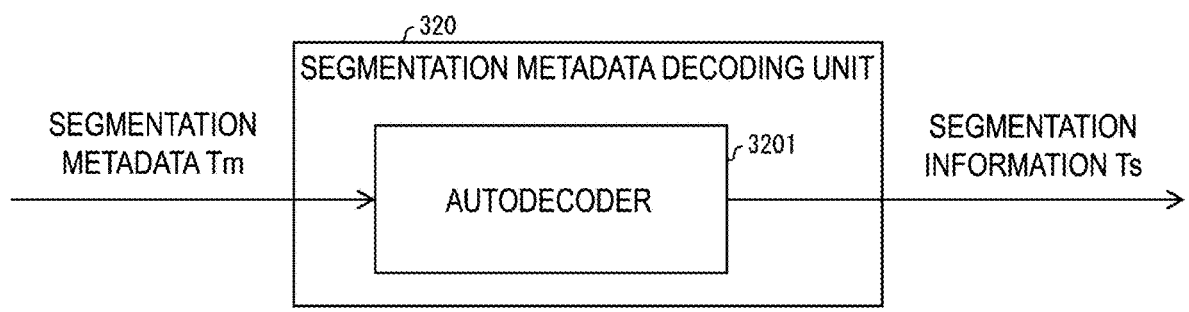
FIG. 7 is a functional block diagram illustrating a configuration of a segmentation metadata decoding unit of the video decoding apparatus according to the present embodiment.

The segmentation metadata decoding unit 320 generates segmentation information Ts with reference to the segmentation metadata Tsm decoded by the image, decoding unit 300. FIG. 7 is a functional block diagram illustrating a configuration of the segmentation metadata decoding unit 320. As illustrated in FIG. 7, the segmentation metadata decoding unit 320 includes an autodecoder 3201. The autodecoder 3201 operates on the segmentation metadata Tsm, and thereby generates the segmentation information Ts. Specifically, the autodecoder 3201 restores the dimension of the segmentation metadata Tsm output by the autoencoder 1302 of the segmentation metadata generation unit 130 included in the video coding apparatus 11, and generates the segmentation information Ts having an increased amount of data. The autodecoder 3201 outputs the generated segmentation information Ts to the super-resolution unit 330.

The super-resolution unit 330 performs prescribed image processing on the decoded image Tc with reference to the segmentation information Ts. Specifically, the super-resolution unit 330 performs super-resolution processing on the decoded image Td with reference to the segmentation information Ts, and thereby generates the super-resolution image Tr.

According to the above configuration, the segmentation information Ts can be used for the super-resolution processing, the segmentation information Ts being generated by restoring, with the use of the autodecoder 3201, the dimension of the segmentation metadata Tsm that is compressed in dimension of the segmented input image by the video coding apparatus 11. In this manner, the video decoding apparatus 31 that can preferably perform the super-resolution processing can be realized.

Configuration Example 1 of Video Coding Apparatus

Figure 8:
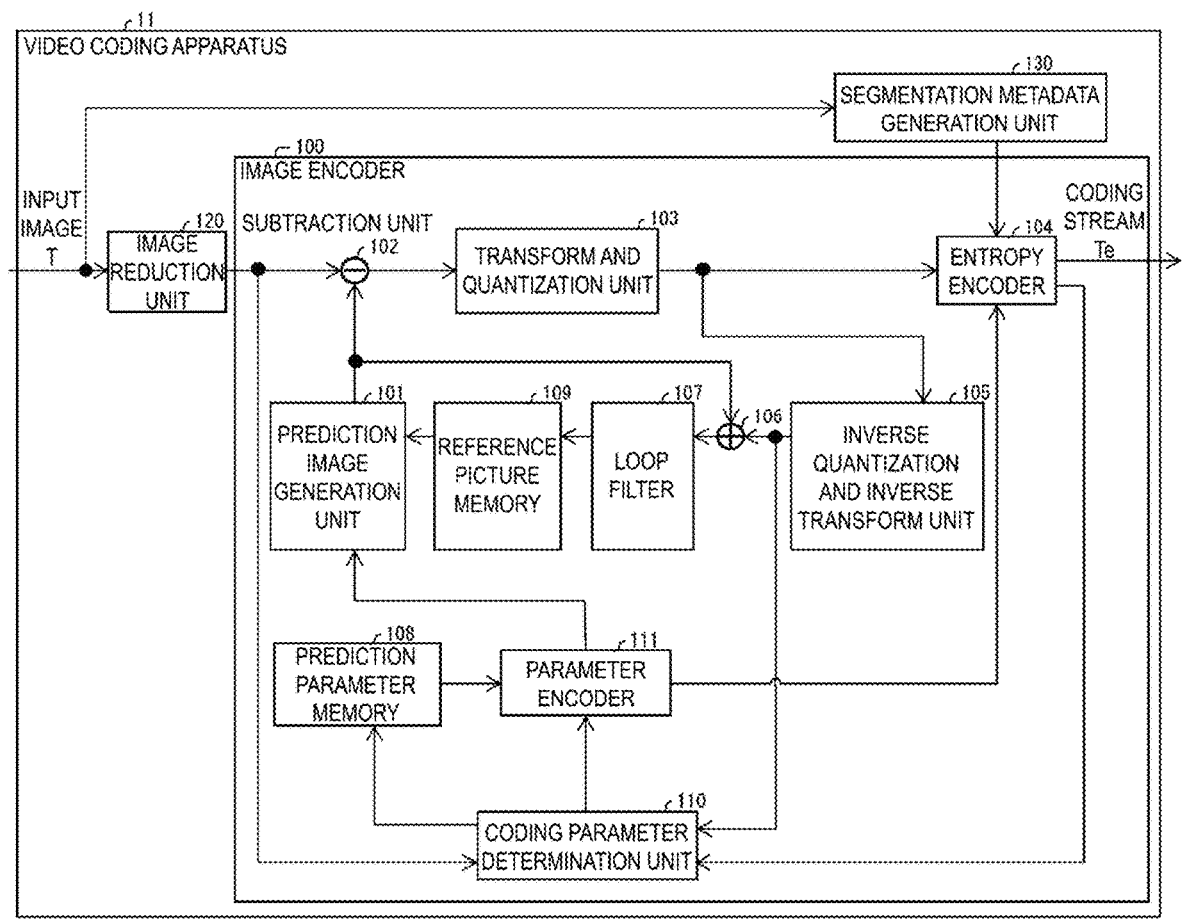
FIG. 8 is a functional block diagram illustrating a configuration of the video coding apparatus according to the present embodiment.

Next, a configuration of the video coding apparatus 11 according to the present embodiment will be described. FIG. 8 is a block diagram illustrating a configuration of the video coding apparatus 11 according to the present embodiment. The video coding apparatus 11 includes an image reduction unit (image processing unit) 120, an image encoder (encoder) 100, and a segmentation metadata generation unit 130.

The image reduction unit 120 performs prescribed image processing on the input image T, and thereby generates the processed image. Specifically, the image reduction unit 120 performs image reduction processing on the input image T, and thereby generates a reduced image. For example, the image reduction unit 120 performs image reduction processing on the input image T having a resolution of 8K, and thereby generates a reduced image of 4K.

The image encoder 100 codes the reduced image (processed image), and thereby generates the coding stream Te. The image encoder 100 includes the segmentation metadata Tsm generated by the segmentation metadata generation unit 130 in the coding stream Te. The image encoder 100 includes a prediction image generation unit 101, a subtraction unit 102, a transform and quantization unit 103, an inverse quantization and inverse transform unit 105, an addition unit 106, a loop filter 107, a prediction parameter memory (prediction parameter storage unit, frame memory) 108, a reference picture memory (reference image storage unit, frame memory) 109, a coding parameter determination unit 110, and a parameter encoder 111.

The prediction image generation unit 101 generates a prediction image for each CU being a region where each picture of the image T is split. The prediction image generation unit 101 operates in the same manner as the prediction image generation unit 309 described above, and thus description thereof is omitted.

The subtraction unit 102 subtracts pixel values of the prediction image of the block input from the prediction image generation unit 101 from pixel values of the image T, and thereby generates the prediction errors. The subtraction unit 102 outputs the prediction errors to the transform and quantization unit 103.

The transform and quantization unit 103 calculates the transform coefficients through frequency transform with respect to the prediction errors input from the subtraction unit 102, and derives quantization and transform coefficients through quantization. The transform and quantization unit 103 outputs the quantization and transform coefficients to the entropy encoder 104 and the inverse quantization and inverse transform unit 105.

The inverse quantization and inverse transform unit 105 is the same as the inverse quantization and inverse transform unit 311 (FIG. 6) of the video decoding apparatus 31, and thus description thereof is omitted. The calculated prediction errors are output to the addition unit 106.

To the entropy encoder 104, quantization and transform coefficients are input from the transform and quantization unit 103, and coding parameters are input from the parameter encoder 111. For example, the coding parameters include codes such as a reference picture index refIdxLX, a prediction vector index mvp_LX_idx, a difference vector mvdLX, a prediction mode predMode, and a merge index merge_idx.

The entropy encoder 104 performs entropy coding on the split information, the prediction parameters, the quantization and transform coefficients, and the like to generate the coding stream Te, and outputs the coding stream Te.

The parameter encoder 111 includes a header encoder 1110, a CT information encoder 1111, a CU encoder 1112 (prediction mode encoder), an inter prediction parameter encoder 112, and an intra prediction parameter encoder 113, which are not illustrated. Furthermore, the CU encoder 1112 includes a TU encoder 1114.

The addition unit 106 adds the pixel value of the prediction image of the block input from the prediction image generation unit 101 and the prediction errors input from the inverse quantization and inverse transform unit 105 for each pixel, and generates a local decoded image Tld. The addition unit 106 stores the generated local decoded image Tld in the reference picture memory 109.

The loop filter 107 applies a deblocking filter, an SAO, and an ALF to the local decoded image Tld generated by the addition unit 106. Note that the loop filter 107 need not necessarily include the three types of filters described above, and may be a configuration of only a deblocking filter, for example.

The prediction parameter memory 108 stores the prediction parameters generated by the coding parameter determination unit 110 at a position predetermined for each target picture and CU.

The reference picture memory 109 stores the local decoded image Tld generated by the loop filter 107 at a position predetermined for each target picture and CU.

The coding parameter determination unit 110 selects one set among multiple sets of coding parameters. The coding parameters are the above-described QT, BT, or TT split information, prediction parameters, or parameters to be a target of coding generated in association with these. The prediction image generation unit 101 generates the prediction image by using these coding parameters.

The coding parameter determination unit 110 calculates RD cost values indicating a volume of an information quantity and coding errors for each of the multiple sets. For example, the RD cost value is a sum of a code amount and a value of multiplying a coefficient $\lambda$ by a square error. The code amount is an information quantity of the coding stream Te obtained by performing entropy coding on a quantization error and a coding parameter. The square error is a sum of squares of the prediction error calculated in the subtraction unit 102. The coefficient $\lambda$ is a real number that is larger than zero set in advance. The coding parameter determination unit 110 selects a set of coding parameters by which the calculated cost value is minimized. In this manner, the entropy encoder 104 outputs the selected set of coding parameters as the coding stream Te. The coding parameter determination unit 110 stores the determined coding parameters in the prediction parameter memory 108.

Note that, part of the video coding apparatus 11 and the video decoding apparatus 31 in the above-mentioned embodiments, for example, the entropy decoding unit 301, the parameter decoding unit 302, the loop filter 305, the prediction image generation unit 308, the inverse quantization and inverse transform unit 311, the addition unit 312, the prediction image generation unit 101, the subtraction unit 102, the transform and quantization unit 103, the entropy encoder 104, the inverse quantization and inverse transform unit 105, the loop filter 107, the coding parameter determination unit 110, and the parameter encoder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the video coding apparatus 11 or the video decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit, the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Figure 9:
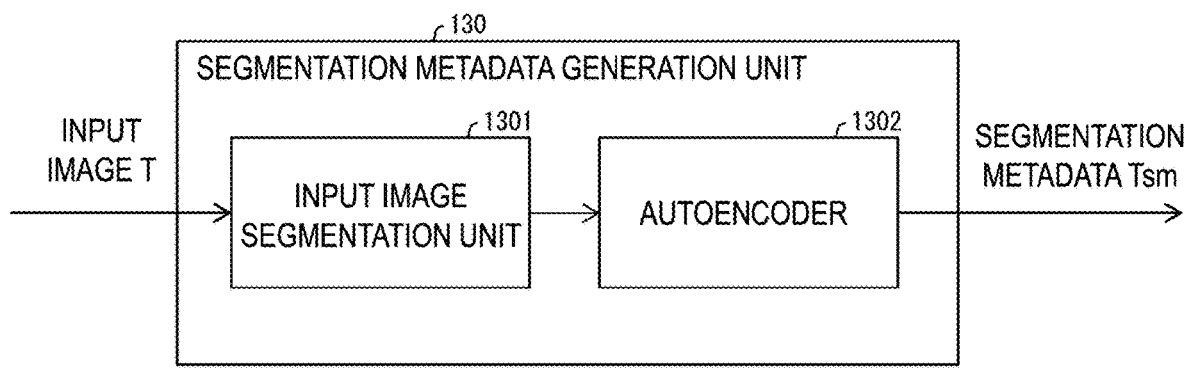
FIG. 9 is a functional block diagram illustrating a configuration of a segmentation metadata generation unit of the video coding apparatus according to the present embodiment.

The segmentation metadata generation unit 130 generates the segmentation metadata Tsm with reference to the input image T. FIG. 9 is a functional block diagram illustrating a configuration of the segmentation metadata generation unit 130. As illustrated in FIG. 9, the segmentation metadata generation unit 130 includes an input image segmentation unit 1301 and an autoencoder 1302. The input image segmentation unit 1301 performs segmentation processing on the input image T, and thereby generates a segmented input image. The segmentation processing is processing of performing segmentation for each region of each constituent element included in the input image T. The autoencoder 1302 operates on the segmented input image. Specifically, the autoencoder 1302 compresses the dimension of the segmented input image generated by the input image segmentation unit 1301, and generates the segmentation metadata Tsm having a reduced amount of data. The autoencoder 1302 outputs the segmentation metadata Tsm to the image encoder 100.

Segmentation Metadata

Figure 10:
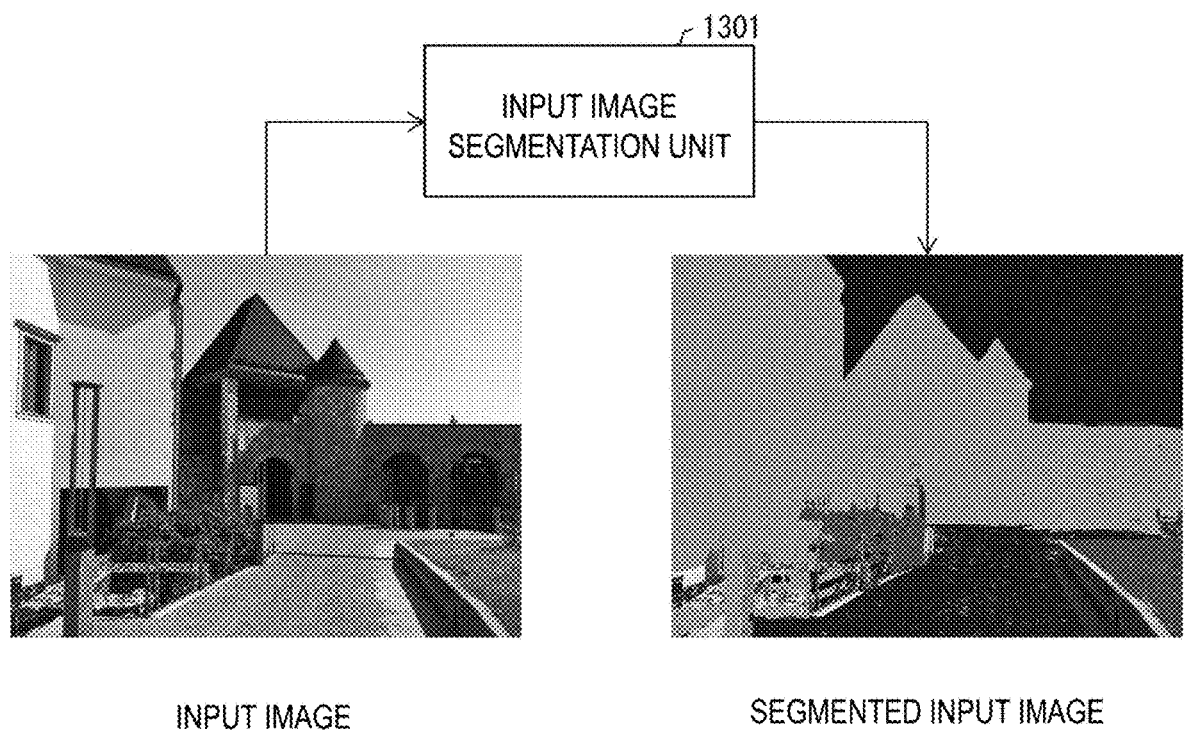
FIG. 10 is a diagram illustrating an example of segmentation metadata.

FIG. 10 is a diagram illustrating an example of the segmentation metadata Tsm. The left image of FIG. 10 is an example of the input image T input to the input image segmentation unit 1301. The right image of FIG. 10 is an example of the segmented input image, which is generated by the input image segmentation unit 1301 performing segmentation processing on the input image T. As illustrated in FIG. 10, the segmented input image is an image in which colors of different intensity are assigned to each segment, such as a part of the sky, a part of buildings, and a part of a road. For example, in a case of buildings, parts of buildings may belong to the same segment as illustrated in FIG. 10, or each building may belong to its individual segment. In addition to the segments illustrated in FIG. 10, the segments may be various objects, such as a person, an animal, and a vehicle. Each part may be a segment. For example, in a case that a person is included in the input image T, each part such as an eye, a nose, a mouth, and hair of the person may be a segment. In a case that a building is included in the input image T, each part such as a roof, a window, and a door may be a segment. In this manner, with the segmented input image that is processed by the segmentation processing by the image encoder 100 of the video coding apparatus 11 being included in the coding stream Te, the video decoding apparatus 31 can preferably generate the super-resolution image Tr.

Syntax

FIG. 11 is a diagram illustrating syntax included in the segmentation metadata Tsm. As illustrated in FIG. 11, some of the syntax elements included in the sequence parameter set SPS (represented by Segmentation_meta_data (payloadSize) in FIG. 11) of segmentation data are illustrated, "height" represents the vertical length of the image, "width" represents the horizontal length of the image, "channel" represents the number of channels.

The input image segmentation unit 1301 generates as many segmentation metadata Tsm (meta_data[i][j][k]) as the number of product of the vertical length (height, i), the horizontal length (width, j), and the number of channels (channel, k, for example, 128) of one-nth (for example, n=16) the size of the picture size, for example. The input image segmentation unit 1301 outputs the generated segmentation metadata Tsm to the autoencoder 1302.

Note that, a descriptor (Descriptor) ue(v) indicates that syntax associated with this descriptor is an unsigned numerical value, and a value is ceded by variable length coding. se(v) indicates that syntax associated with this descriptor is a signed numerical value, and variable length coding is separately performed on a sign and an absolute value.

According to the above configuration, the video coding apparatus 11 can output, to the video decoding apparatus 31, the coding stream Te including the segmentation metadata Tsm obtained by compressing the dimension of the segmented input image. With the video coding apparatus 11 outputting the coding stream Te including the segmentation metadata Tsm, the video decoding apparatus 31 can use the segmentation information Is, which is generated by restoring the dimension of the segmentation metadata Tsm, for the super-resolution processing. In this manner, such a video coding apparatus 11 that enables the video decoding apparatus 31 to preferably perform the super-resolution processing can be realized.

Configuration Example 2 of Video Decoding Apparatus

Figure 12:
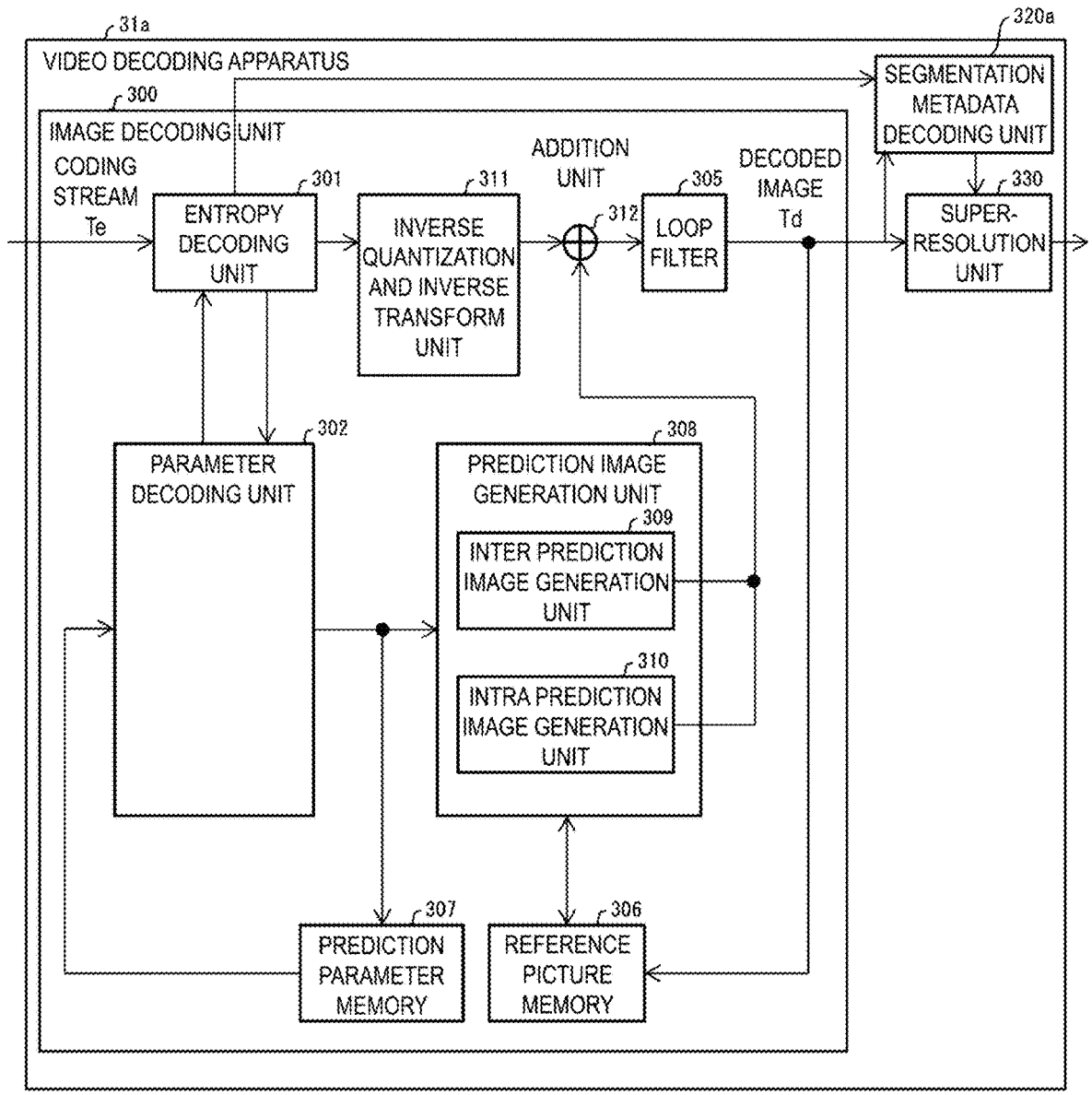
FIG. 12 is a functional block diagram illustrating a configuration of the video decoding apparatus according to the present embodiment.

An example of the video decoding apparatus will be described. FIG. 12 is a functional block diagram illustrating a configuration of a video decoding apparatus 31a according to the present example. As Illustrated it FIG. 12, the video decoding apparatus 31a has a configuration including a segmentation metadata decoding unit 320a, instead of the segmentation metadata decoding unit 320 of the video decoding apparatus 31 illustrated in FIG. 6.

Figure 13:
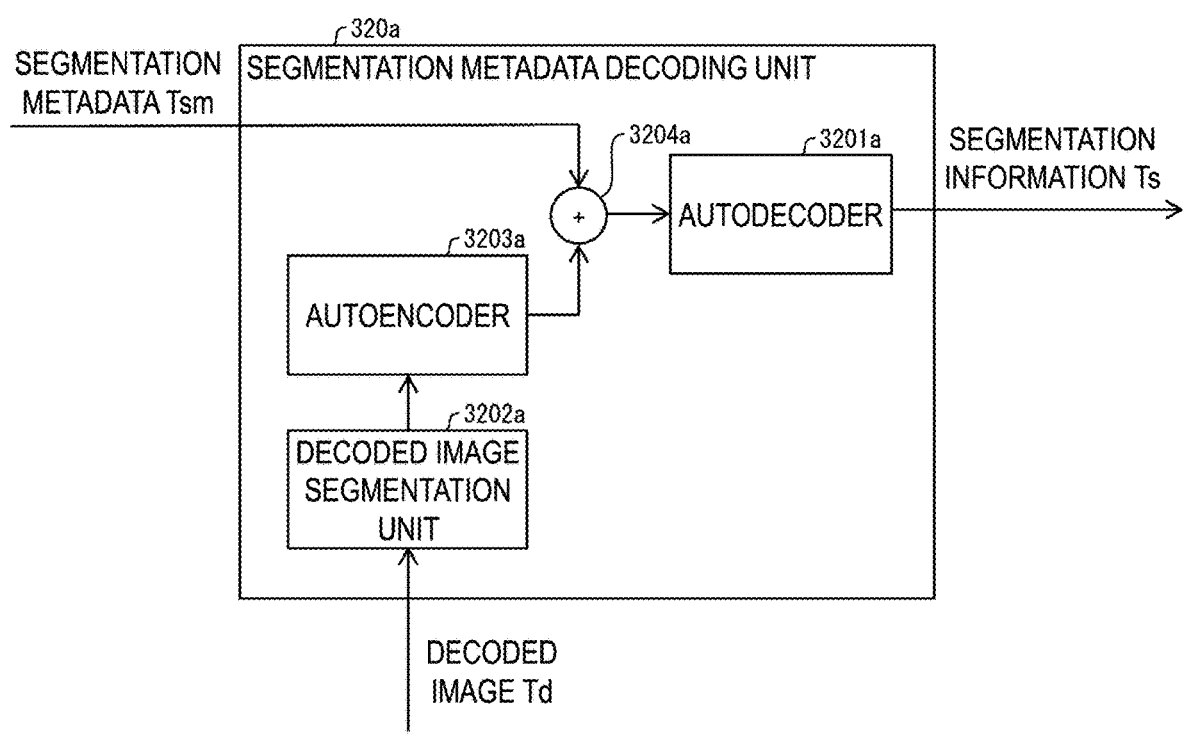
FIG. 13 is a functional block diagram illustrating a configuration of the segmentation metadata decoding unit of the video decoding apparatus according to the present embodiment.

FIG. 13 is a functional block diagram illustrating a configuration of the segmentation metadata decoding unit 320a. As illustrated in FIG. 13, the segmentation metadata decoding unit 320a includes a decoded image segmentation unit 3202a, an autoencoder 3203a, an addition unit 3204a, and an autodecoder 3201a.

The decoded image segmentation unit 3202a performs segmentation processing on the decoded image Td, and thereby generates a segmented decoded image. The decoded image segmentation unit 3202a outputs the generated segmented decoded image to the autoencoder 3203a.

The autoencoder 3203a operates on the segmented decoded image. Specifically, the autoencoder 3203a compresses the dimension of the segmented decoded image generated by the decoded image segmentation unit 3202a to reduce the amount of data. The autoencoder 3203a outputs the compressed segmented decoded image (output data of the autoencoder 3203a) to the addition unit 3204a.

The addition unit 3204a adds the segmentation metadata Tsm and the output data of the autoencoder 3203a. The addition unit 3204a outputs the added result (output data of the addition unit 3204a) to the autodecoder 3201a.

The autodecoder 3201a operates on the output data of the addition unit 3204a, and thereby generates the segmentation information Ts. Specifically, the autodecoder 3201a restores the dimension of the output data of the addition unit 3204a to increase the amount of data. The autodecoder 3201a outputs the generated segmentation information Ts to the super-resolution unit 330.

According to the above configuration, a video coding apparatus 11a can use the segmentation information Ts, which is generated by restoring the dimension of the output data of the addition unit 3204a obtained by adding the segmentation metadata Tsm having a reduced amount of data through compression of the dimension of the segmented input image and the compressed segmented decoded image, for the super-resolution processing. In this manner, the video decoding apparatus 31a that can preferably perform the super-resolution processing can be realized.

Configuration Example 2 of Video Coding Apparatus

Figure 14:
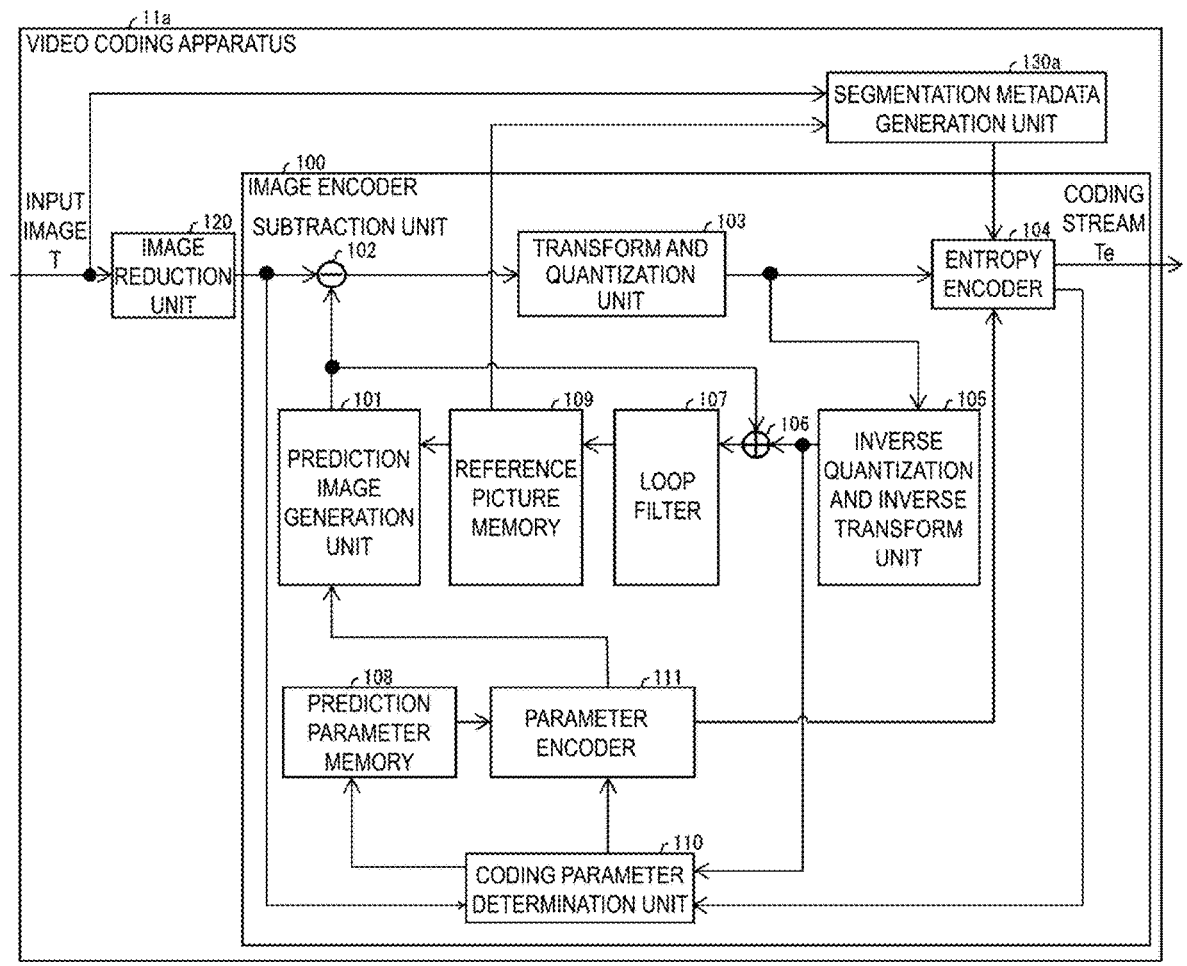
FIG. 14 is a functional block diagram illustrating a configuration of the video coding apparatus according to the present embodiment.

An example of the video coding apparatus that generates the coding stream Te being a processing target of the above-described video decoding apparatus 31a will be described. FIG. 14 is a functional block diagram illustrating a configuration of the video coding apparatus 11a according to the present example. As illustrated in FIG. 14, the video coding apparatus 11a has a configuration including a segmentation metadata generation unit 130a, instead of the segmentation metadata generation unit 130 of the video coding apparatus 11 illustrated in FIG. 9.

Figure 15:
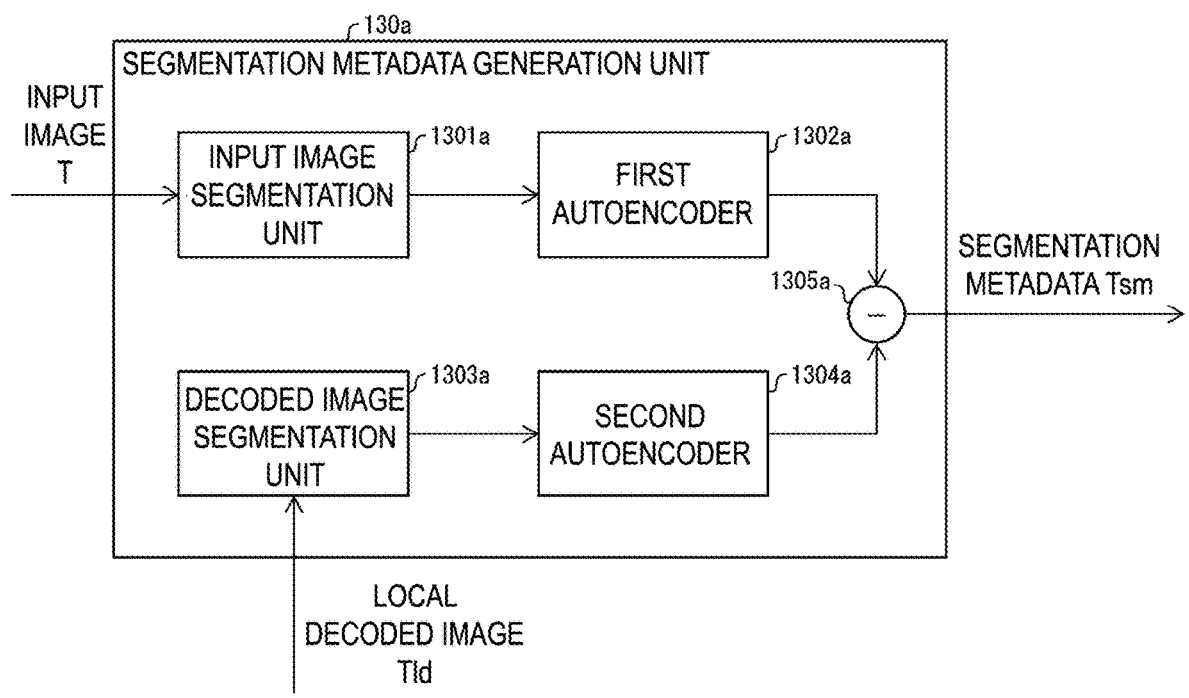
FIG. 15 is a functional block diagram illustrating a configuration of the segmentation metadata generation unit of the video coding apparatus according to the present embodiment.

FIG. 15 is a functional block diagram illustrating a configuration of the segmentation metadata generation unit 130a. As illustrated in FIG. 15, the segmentation metadata generation unit 130a includes an input image segmentation unit 1301a, a first autoencoder 1302a, a decoded image segmentation unit 1303a, a second autoencoder 1304a, and a subtraction unit 1305a.

The input image segmentation unit 1301a performs segmentation processing on the input image T, and thereby generates the segmented input image. The input image segmentation unit 1301a outputs the generated segmented input image to the first autoencoder 1302a.

The first autoencoder 1302a operates on the segmented input image. Specifically, the first autoencoder 1302a compresses the dimension of the segmented input image generated by the input image segmentation unit 1301a to reduce the amount of data. The first autoencoder 1302a outputs the segmented input image (output data of the first autoencoder 1302a) with the compressed dimension to the subtraction unit 1305a.

The decoded image segmentation unit 1303a acquires the local decoded image Tld from the reference picture memory 109. The decoded image segmentation unit 1303a performs segmentation processing on the local decoded image Tld, and thereby generates a segmented local decoded image.

The decoded image segmentation unit 1303a outputs the generated segmented local decoded image to the second autoencoder 1304a.

The second autoencoder 1304a operates on the segmented local decoded image. Specifically, the second autoencoder 1304a compresses the dimension of the segmented local decoded image generated by the decoded image segmentation unit 1303a to reduce the amount of data. The second autoencoder 1304a outputs the segmented local decoded image (output data of the second autoencoder 1304a) with the compressed dimension to the subtraction unit 1305a.

The subtraction unit 1305a obtains a difference between the output data of the first autoencoder 1302a and the output data of the second autoencoder 1304a, and thereby generates the segmentation metadata Tsm. The subtraction unit 1305a outputs the generated segmentation metadata Tsm to the entropy encoder 104 of the image encoder 100.

According to the above configuration, the video coding apparatus 11a can output, to the video decoding apparatus 31a, the coding stream Te including the segmentation metadata Tsm being a difference between the segmented input image with a compressed dimension and the segmented local decoded image with a compressed dimension. With the video coding apparatus 11a outputting the coding stream Te including the segmentation metadata Tsm, the video decoding apparatus 31 can use the segmentation information Ts, which is generated by restoring the dimension of the segmentation metadata Tsm, for the super-resolution processing. In this manner, such a video coding apparatus 11a that enables the video decoding apparatus 31a to preferably perform the super-resolution processing can be realized.

Configuration Example 3 of Video Decoding Apparatus

Figure 16:
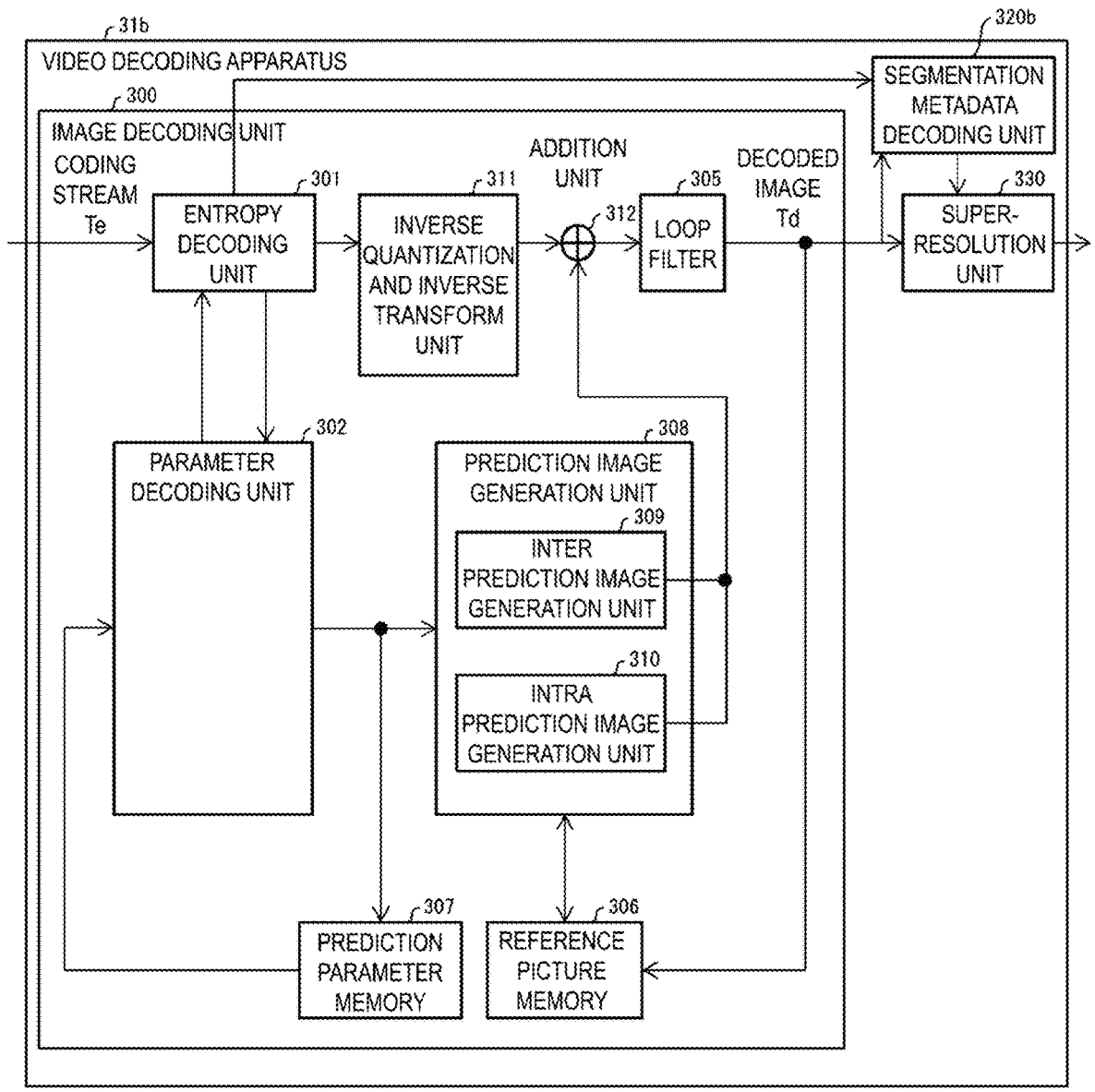
FIG. 16 is a functional block diagram illustrating a configuration of the video decoding apparatus according to the present embodiment.

An example of the video decoding apparatus will be described. FIG. 16 is a functional block diagram illustrating a configuration of a video decoding apparatus 31b according to the present example. As illustrated in FIG. 16, the video decoding apparatus 31b has a configuration including a segmentation metadata decoding unit 320b, instead of the segmentation metadata decoding unit 320 of the video decoding apparatus 31 illustrated in FIG. 6.

Figure 17:
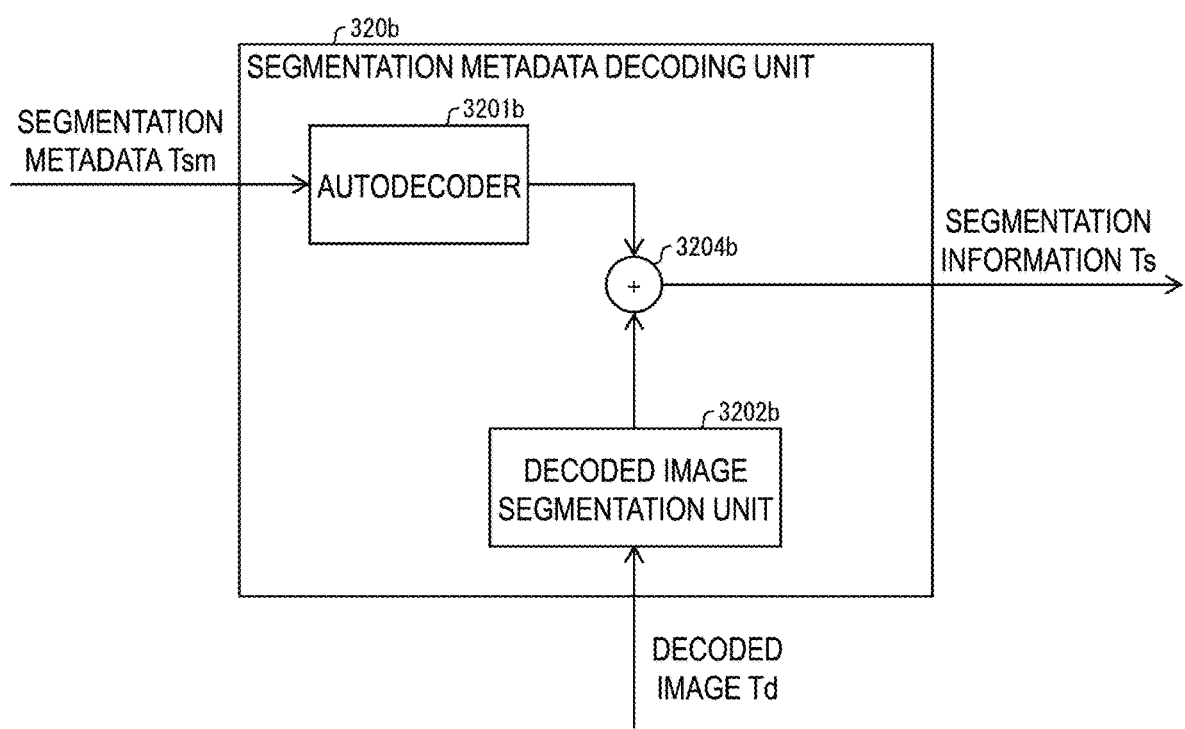
FIG. 17 is a functional block diagram illustrating a configuration of the segmentation metadata decoding unit of the video decoding apparatus according to the present embodiment.

FIG. 17 is a functional block diagram illustrating a configuration of the segmentation metadata decoding unit 320b. As illustrated in FIG. 17, the segmentation metadata decoding unit 320b includes a decoded image segmentation unit 3202b, an autodecoder 3201b, and an addition unit 3204b.

The decoded image segmentation unit 3202b performs segmentation processing on the decoded image Td, and thereby generates the segmented decoded image. The decoded image segmentation unit 3202b outputs the generated segmented decoded image to the addition unit 3204b.

The autodecoder 3201b operates on the segmentation metadata Tsm. Specifically, the autodecoder 3201b restores the dimension of the segmentation metadata Tsm output by the autoencoder 1302b of the segmentation metadata generation unit 130b included in a video coding apparatus 11b to increase the amount of data. The autodecoder 3201b outputs the segmentation metadata Tsm (output data of the autodecoder 3201b) with the restored dimension to the addition unit 3204b.

The addition unit 3204b adds the segmented decoded image and the output data of the autodecoder 3201b, and thereby generates the segmentation information Ts. The addition unit 3204b outputs the generated segmentation information Ts to the super-resolution unit 330.

According to the above configuration, the video coding apparatus 11b can use the segmentation information Ts, which is obtained by adding the output data of the autodecoder 3201b generated by restoring the dimension of the segmentation metadata Tsm having a reduced amount of data through compression of the dimension of the segmented input image with the use of the autodecoder 3201b and the segmented decoded image, for the super-resolution processing. In this manner, the video decoding apparatus 31b that can preferably perform the super-resolution processing can be realized.

Configuration Example 3 of Video Coding Apparatus

Figure 18:
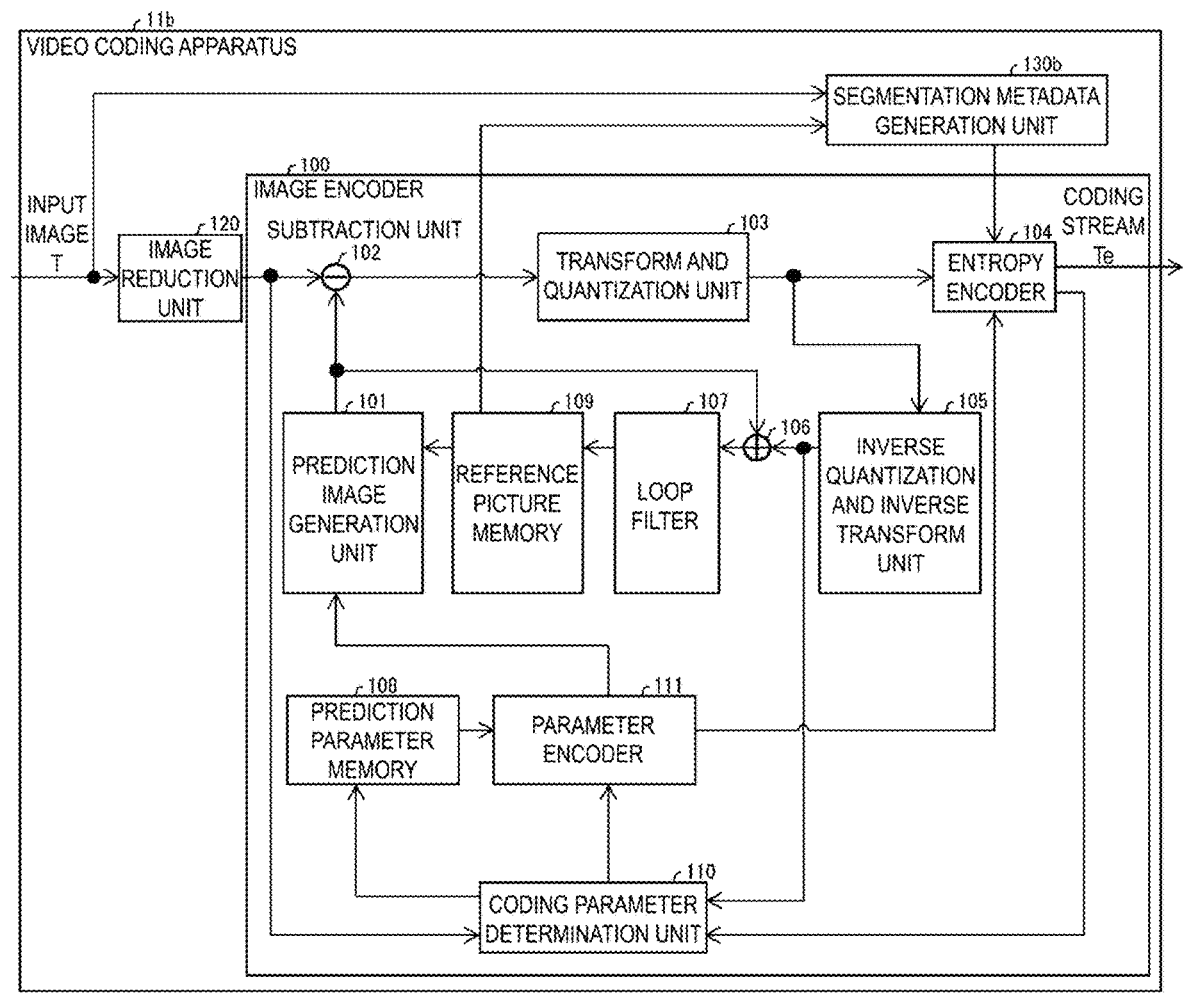
FIG. 18 is a functional block diagram illustrating a configuration of the video coding apparatus according to the present embodiment.

An example of the video coding apparatus that generates the coding stream being a processing target of the above-described video decoding apparatus 31b will be described. FIG. 18 is a functional block diagram illustrating a configuration of the video coding apparatus 11b according to the present example. As illustrated in FIG. 18, the video coding apparatus 11b has a configuration including a segmentation metadata generation unit 130b, instead of the segmentation metadata generation unit 130 of the video coding apparatus 11 illustrated in FIG. 8.

Figure 19:
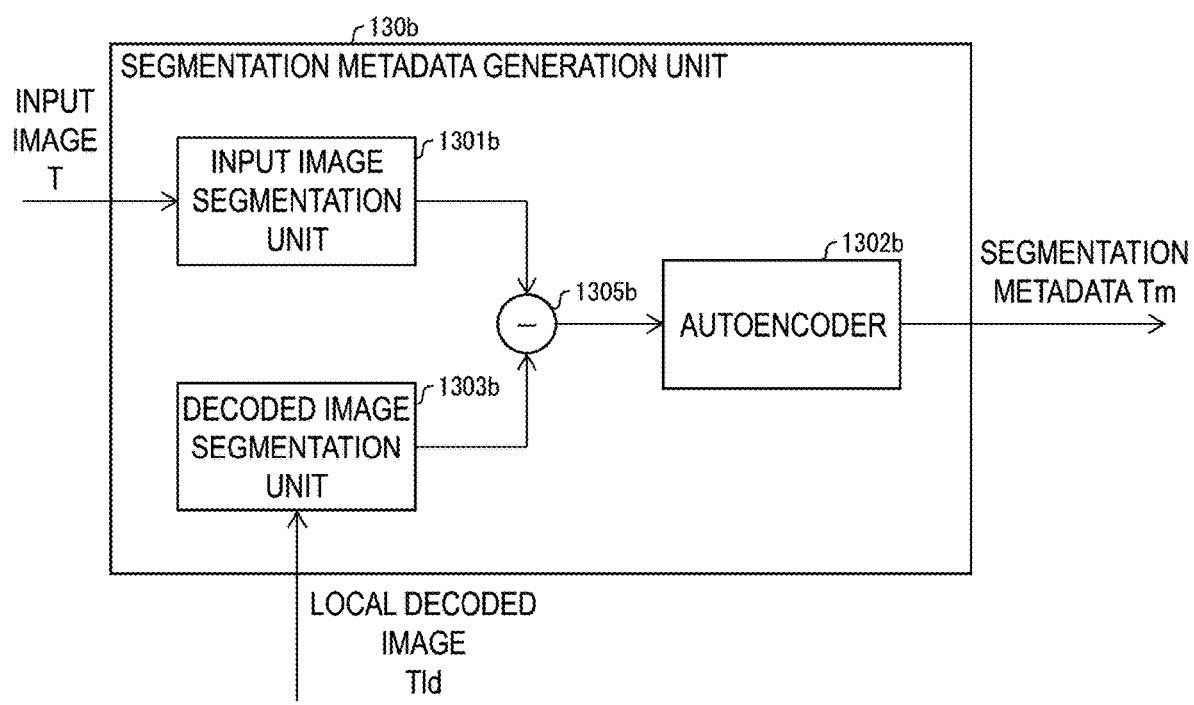
FIG. 19 is a functional block diagram illustrating a configuration of the segmentation metadata generation unit of the video coding apparatus according to the present embodiment.

FIG. 19 is a functional block diagram illustrating a configuration of the segmentation metadata generation unit 130b. As illustrated in FIG. 19, the segmentation metadata generation unit 130b includes an input image segmentation unit 1301b, a decoded image segmentation unit 1303b, a subtraction unit 1305b, and an autoencoder 1302b.

The input image segmentation unit 1301b performs segmentation processing on the input image, and thereby generates the segmented input image. The input image segmentation unit 1301b outputs the generated segmented input image to the subtraction unit 1305b.

The decoded image segmentation unit 1303b performs segmentation processing on the local decoded image Tld, and thereby generates the segmented local decoded image. The decoded image segmentation unit 1303b outputs the generated segmented local decoded image to the subtraction unit 1305b.

The subtraction unit 1305b calculates a difference between the segmented input image and the segmented local decoded image. The subtraction unit 1305b outputs the calculated difference (output data of the subtraction unit 1305b) between the segmented input image and the segmented local decoded image to the autoencoder 1302b.

The autoencoder 1302b operates on the output data of the subtraction unit 1305b, and thereby generates the segmentation metadata. Specifically, the autoencoder 1302b compresses the dimension of the output data of the subtraction unit 1305b, and thereby generates the segmentation metadata Tsm having a reduced amount of data. The autoencoder 1302b outputs the generated segmentation metadata Tsm to the entropy encoder 104 of the image encoder 100.

According to the above configuration, the video coding apparatus 11a can output, to the video decoding apparatus 31b, the coding stream Te including the segmentation metadata Tsm with a compressed dimension of the difference between the segmented input image and the segmented local decoded image. With the video coding apparatus 11b outputting the coding stream Te including the segmentation metadata Tsm, the video decoding apparatus 31b can use the segmentation information Ts, which is generated by restoring the dimension of the segmentation metadata Tsm, for the super-resolution processing. In this manner, such a video coding apparatus 11b that enables the video decoding apparatus 31b to preferably perform the super-resolution processing can be realized.

Configuration Example 4 of Video Decoding Apparatus

Figure 20:
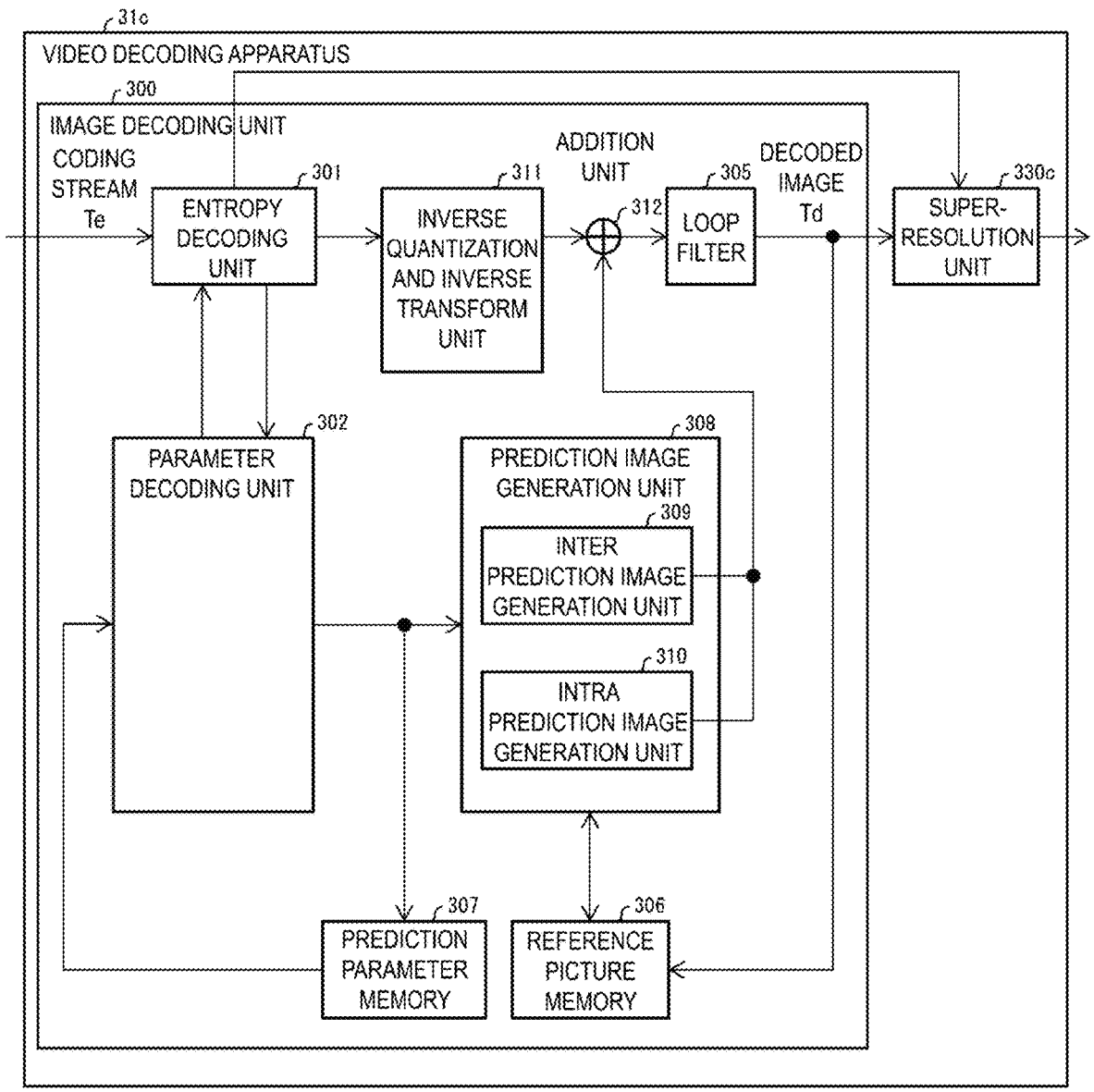
FIG. 20 is a functional block diagram illustrating a configuration of the video decoding apparatus according to the present embodiment.

An example of the video decoding apparatus will be described. FIG. 20 is a functional block diagram illustrating a configuration of a video decoding apparatus 31c according to the present example. As illustrated in FIG. 20, the video decoding apparatus 31c is different from the video decoding apparatus 31 illustrated in FIG. 6 in that the video decoding apparatus 31c does not include the segmentation metadata decoding unit 320 and includes a super-resolution unit 330c instead of the super-resolution unit 330. In the present example, the image decoding unit 300 decodes the coding stream Te to obtain the decoded image Td and super-resolution metadata Trm used for the super-resolution processing. The super-resolution unit 330c performs super-resolution processing on the decoded image Td with reference to the super-resolution metadata Trm, and thereby generates the super-resolution image Tr.

Figure 21:
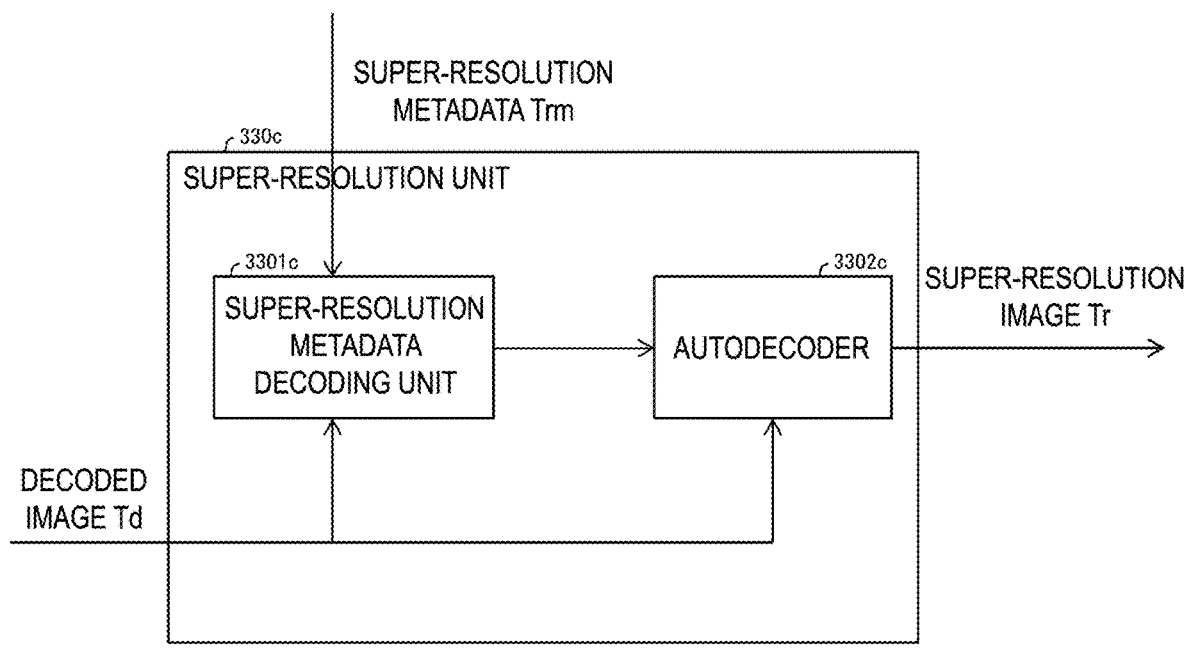
FIG. 21 is a functional block diagram illustrating a configuration of a super-resolution unit of the video decoding apparatus according to the present embodiment.

FIG. 21 is a functional block diagram illustrating a configuration of the super-resolution unit 330c. As illustrated in FIG. 21, the super-resolution unit 330c includes a super-resolution metadata decoding unit 3301c and an autodecoder 3302c.

The super-resolution metadata decoding unit 3301c decodes the super-resolution metadata Trm with reference to the decoded image Td. The super-resolution metadata decoding unit 3301c outputs the decoded super-resolution metadata Trm (output data of the super-resolution metadata decoding unit 3301c) to the autodecoder 3302c.

The autodecoder 3302c receives input of the output data of the super-resolution metadata decoding unit 3301c and the decoded image Td, and outputs the super-resolution image Tr. Specifically, the autodecoder 3302c restores the dimension of the output data of the super-resolution metadata decoding unit 3301c to increase the amount of data.

According to the above configuration, a video coding apparatus 11c can use the super-resolution metadata Trm, which is generated by restoring the dimension of the super-resolution metadata generated with reference to the input image T with a compressed dimension and the local decoded image Tld with the use of the autodecoder 3302c, for the super-resolution processing. In this manner, the video decoding apparatus 31c that can preferably perform the super-resolution processing can be realized.

Figure 26:
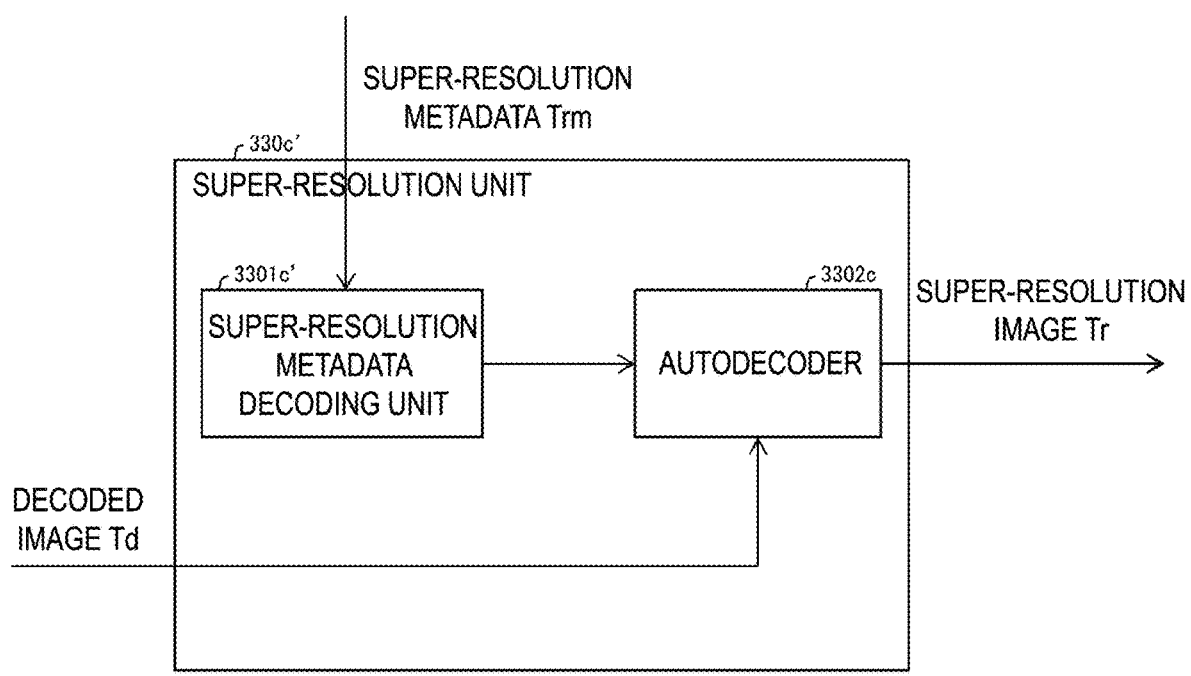
FIG. 26 is a functional block diagram illustrating a configuration of the super-resolution unit of the video decoding apparatus according to the present embodiment.

The video decoding apparatus 31c may include a super-resolution unit 330c', instead of the super-resolution unit 330c. FIG. 26 is a functional block diagram illustrating a configuration of the super-resolution unit 330c'. As illustrated in FIG. 26, the super-resolution unit 330c' induces a super-resolution metadata decoding unit 3301c' and an autodecoder 3302c.

The super-resolution metadata decoding unit 3301c' decodes the super-resolution metadata Trm. The super-resolution metadata decoding unit 3301c' outputs the decoded super-resolution metadata Trm (output data of the super-resolution metadata decoding unit 3301c') to the autodecoder 3202c.

The autodecoder 3302c receives input of the output, data of the super-resolution metadata decoding unit 3301c' and the decoded image Td, and outputs the super-resolution image Tr. Specifically, the autodecoder 3302c restores the dimension of the output data of the super-resolution metadata decoding unit 3301c' to increase the amount of data.

According to the above configuration, the video coding apparatus 11c can use the super-resolution metadata Trm, which is generated by restoring the dimension of the super-resolution metadata generated with reference to the input image T with a compressed dimension and the local decoded image Tld with the use of the autodecoder 3302c, for the super-resolution processing. In this manner, the video decoding apparatus 31c that can preferably perform the super-resolution processing can be realized.

Configuration Example 4 of Video Coding Apparatus

Figure 22:
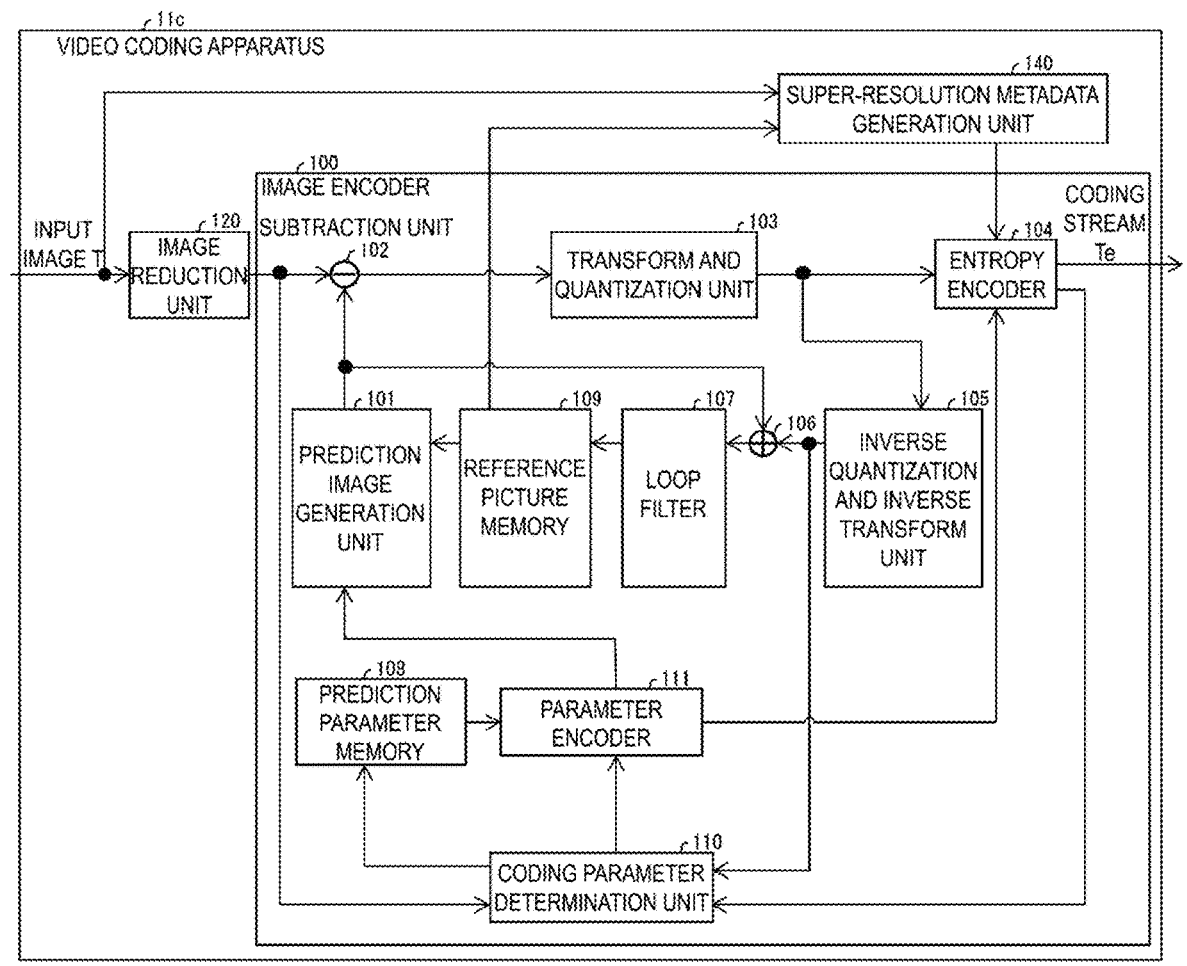
FIG. 22 is a functional block diagram illustrating a configuration of the video coding apparatus according to the present embodiment.

An example of the video coding apparatus that generates a coding stream Te being a processing target of the above-described video decoding apparatus 31c will be described. FIG. 22 is a functional block diagram illustrating a configuration of the video coding apparatus 11c according to the present example. As illustrated in FIG. 22, the video coding apparatus 11c has a configuration including an image reduction unit 120c and a super-resolution metadata generation unit 140, instead of the image reduction unit 120 and the segmentation metadata generation unit 130 of the video coding apparatus 11 illustrated in FIG. 8. The image reduction unit 120c performs image reduction processing on the input image T, and thereby generates the reduced image. The image encoder 100 codes the reduced image, and thereby generates the coding stream Te. The super-resolution metadata generation unit 140 generates the super-resolution metadata Trm with reference to the local decoded image Tld and the input image T. The image encoder 100 includes the super-resolution metadata Trm in the coding stream Te.

Figure 23:
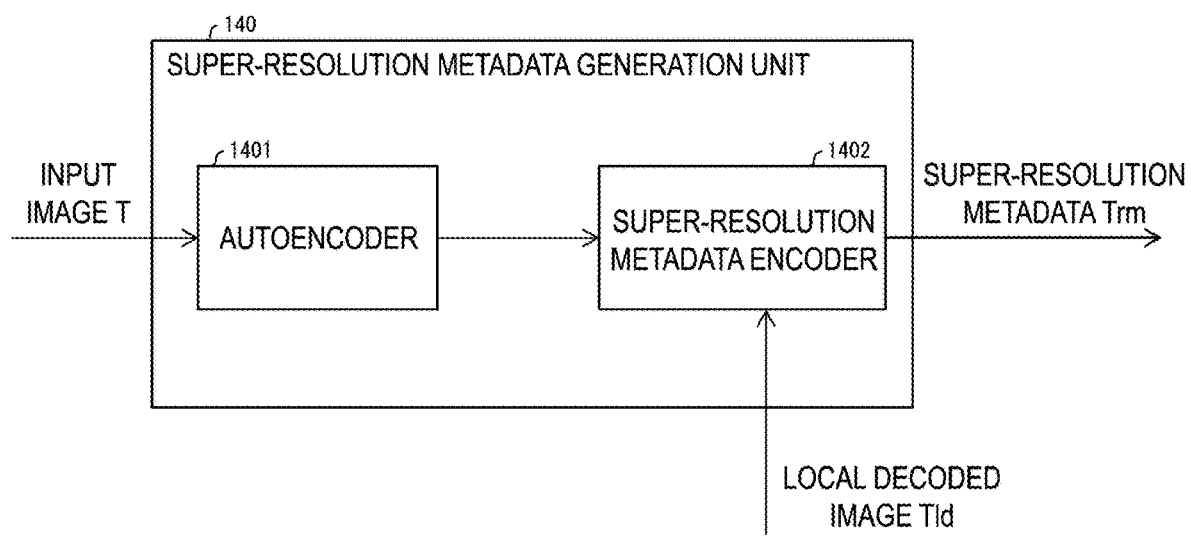
FIG. 23 is a functional block diagram illustrating a configuration of a super-resolution metadata generation unit of the video coding apparatus according to the present embodiment.

FIG. 23 is a functional block diagram illustrating a configuration of the super-resolution metadata generation unit 140. As illustrated in FIG. 23, the super-resolution metadata generation unit 140 includes an autoencoder 1401 and a super-resolution metadata encoder 1402.

The autoencoder 1401 operates on the input image T. Specifically, the autoencoder 1401 compresses the dimension of the input image T to reduce the amount of data. The autoencoder 1401 outputs the input image T (output, data of the autoencoder 1401) with the compressed dimension to the super-resolution metadata encoder 1402.

The super-resolution metadata encoder 1402 generates the super-resolution metadata Trm with reference to the output data of the autoencoder 1401 and the local decoded image Tld.

According to the above configuration, the video coding apparatus 11c can output, to the video decoding apparatus 31c, the coding stream Te including the super-resolution metadata generated with reference to the output data of the autoencoder 1401 and the local decoded image Tld. Therefore, the video decoding apparatus 31c can generate the super-resolution image Tr by restoring the dimension of the super-resolution metadata Trm. In this manner, such a video coding apparatus 11c that enables the video decoding apparatus 31c to preferably perform the super-resolution processing can be realized.

Figure 27:
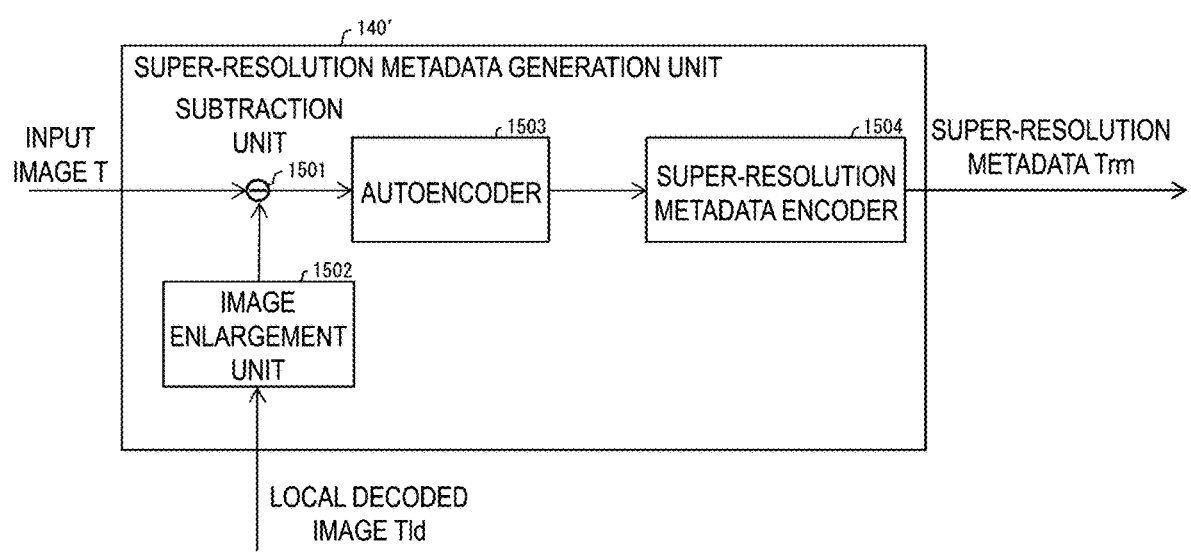
FIG. 27 is a functional block diagram illustrating a configuration of the super-resolution metadata generation unit of the video coding apparatus according to the present embodiment.

The video coding apparatus 11c may include a super-resolution metadata generation unit 140', instead of the super-resolution metadata generation unit 140. FIG. 27 is a functional block diagram illustrating a configuration of the super-resolution metadata generation unit 140'. As illustrated in FIG. 27, the super-resolution metadata generation unit 140' includes a subtraction unit 1501, an image enlargement unit 1502, an autoencoder 1503, and a super-resolution metadata encoder 1504. The image enlargement unit 1502 enlarges the local decoded image Tld from the reference picture memory 109 so as to have the same resolution as the input image T. The subtraction unit 1501 obtains a difference between the enlarged image and the input image T. The subtraction unit 1501 outputs the difference image (output data of the subtraction unit 1501) to the autoencoder 1503. The autoencoder 1503 compresses the dimension of the difference image, and reduces the amount of data. The autoencoder 1503 outputs the input image T (output data of the autoencoder 1503) with the compressed dimension to the super-resolution metadata encoder 1504.

The super-resolution metadata encoder 1504 generates the super-resolution metadata Trm, based on the output data of the autoencoder 1503.

According to the above configuration, the video coding apparatus 11c can use the difference image being a difference between an input image signal and the enlarged image of the local decoded image as an input for the autoencoder 1503, and can output the coding stream Te including the super-resolution metadata generated based on the output data to the video decoding apparatus 31c. Therefore, the video decoding apparatus 31c can generate the super-resolution image Tr by restoring the dimension of the super-resolution metadata Trm. In this manner, such a video coding apparatus 11c that enables the video decoding apparatus 31c to preferably perform the super-resolution processing can be realized.

Configuration Example 5 of Video Decoding Apparatus

Figure 24:
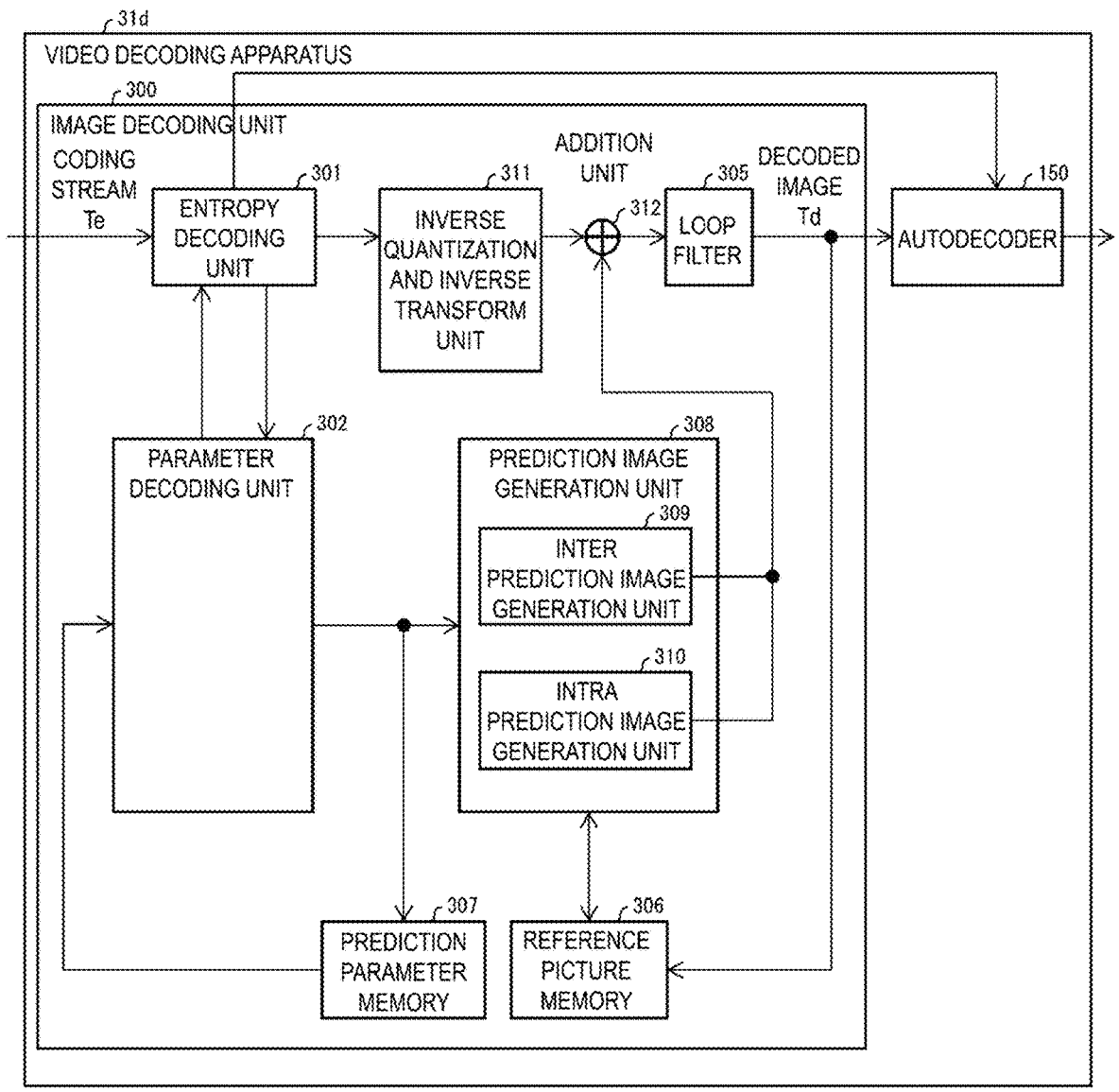
FIG. 24 is a functional block diagram illustrating a configuration of the video decoding apparatus according to the present embodiment.

An example of the video decoding apparatus will be described. FIG. 24 is a functional block diagram illustrating a configuration of a video decoding apparatus 31d according to the present example. As illustrated in FIG. 24, the video decoding apparatus 31d has a configuration including an autodecoder 150, instead of the super-resolution unit 330c of the video decoding apparatus 31c illustrated in FIG. 20. The image decoding unit 300 decodes the coding stream Te to obtain the decoded image Td and the super-resolution metadata Trm. The autodecoder 150 receives input of the decoded image Td and the super-resolution metadata Trm, and outputs the super-resolution image Tr.

The autodecoder 150 of the video decoding apparatus 31d learns to reproduce the input image T, based on output data of an autoencoder 160 of a video coding apparatus 11d and the decoded image Td.

According to the above configuration, the video coding apparatus 11d decodes the coding stream Te including the input image T with a compressed dimension to obtain the decoded image Td and the super-resolution metadata Trm, and can use the decoding resultant for the super-resolution processing. In this manner, the video decoding apparatus 31d that can preferably perform the super-resolution processing can be realized.

Configuration Example 5 of Video Coding Apparatus

Figure 25:
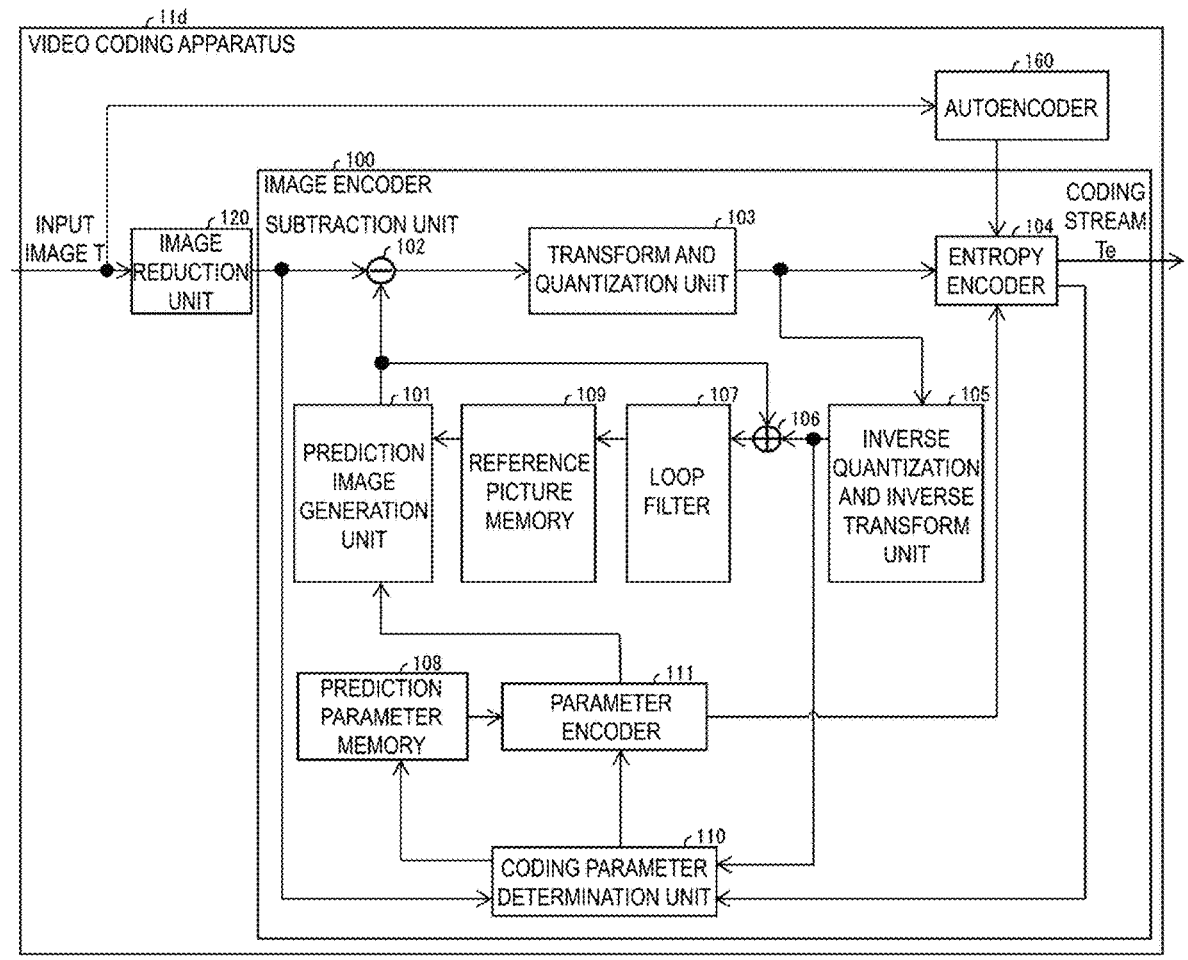
FIG. 25 is a functional block diagram illustrating a configuration of the video coding apparatus according to the present embodiment.

An example of the video coding apparatus that generates the coding stream Te being a processing target of the above-described video decoding apparatus 31d will be described. FIG. 25 is a functional block diagram illustrating a configuration of the video coding apparatus 11d according to the present example. As illustrated in FIG. 25, the video coding apparatus 11d has a configuration including an autoencoder 160, instead of the super-resolution metadata generation unit 140 of the video coding apparatus 11c illustrated in FIG. 22. The autoencoder 160 operates on the input image T. Specifically, the autoencoder 160 compresses the dimension of the input image T to reduce the amount of data, and thereby generates the super-resolution metadata Trm (output data of the autoencoder 160). The image encoder 100 includes the output data of the autoencoder 160 in the coding stream Te.

According to the above configuration, the video coding apparatus 11d can output, to the video decoding apparatus 31d, the coding stream Te including the input image T with a compressed dimension. Therefore, the video decoding apparatus 31d can decode the input coding stream Te to obtain the decoded image Td and the super-resolution metadata Trm, and can use the decoding resultant for the super-resolution processing. In this manner, such a video coding apparatus 11d that enables the video decoding apparatus 31d to preferably perform the super-resolution processing can be realized.

A part or all of the video coding apparatus 11, 11a, 11b, 11c, or 11d (hereinafter simply referred to as the video coding apparatus 11) and the video decoding apparatus 31, 31a, 31b, 31c, or 31d (hereinafter simply referred to as the video decoding apparatus 31) of the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiments and various amendments can be made to a design that falls within the scope that does not depart from the gist of the disclosure.

Application Examples

The above-mentioned video coding apparatus 11 and the video decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

Figure 2:
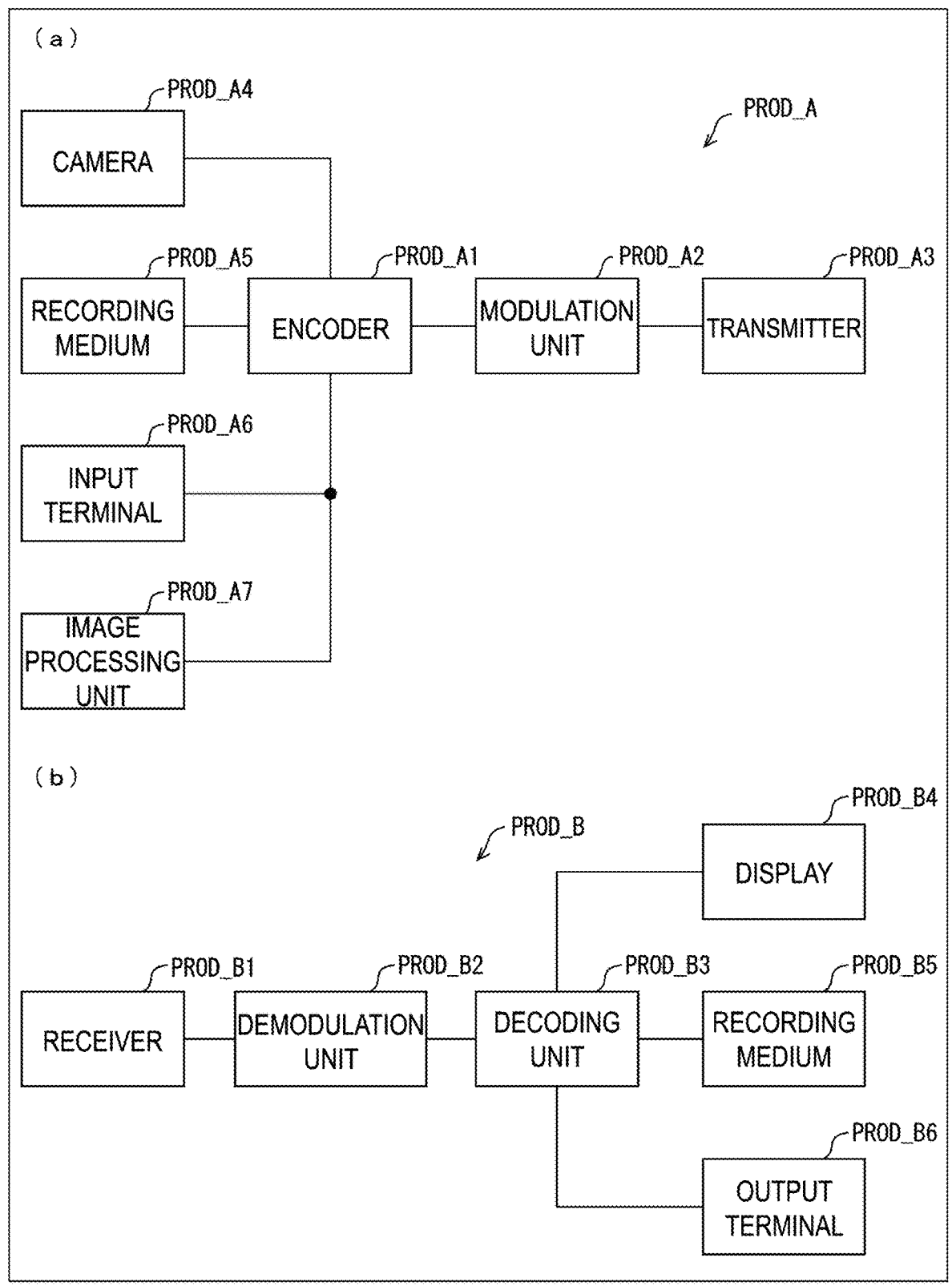
FIG. 2 is a diagram illustrating a configuration of a transmitting apparatus equipped with a video coding apparatus and a receiving apparatus equipped with a video decoding apparatus according to the present embodiment. (a) illustrates the transmitting apparatus equipped with the video coding apparatus, and (b) illustrates the receiving apparatus equipped with the video decoding apparatus.

At first, referring to FIG. 2, it will be described that the above-mentioned video coding apparatus 11 and the video decoding apparatus 31 can be utilized for transmission and reception of videos.

FIG. 2(a) is a block diagram illustrating a configuration of a transmitting apparatus PROD_A installed with the video coding apparatus 11. As illustrated in FIG. 2(a), the transmitting apparatus PROD_A includes an encoder PROD_A1 which obtains coded data by coding videos, a modulation unit PROD_A2 which obtains modulation signals by modulating carrier waves with the coded data obtained by the encoder PROD_A1, and a transmitter PROD_A3 which transmits the modulation signals obtained by the modulation unit PROD__A2. The above-mentioned video coding apparatus 11 is utilized as the encoder PROD__A1.

The transmitting apparatus PROD_A may further include a camera PROD_A4 imaging videos, a recording medium PROD_A5 recording videos, an input terminal PROD_A6 to input videos from the outside, and an image processing unit PROD_A7 which generates or processes images, as sources of supply of the videos input into the encoder PROD_A1. In FIG. 2(a), although the configuration that the transmitting apparatus PROD_A includes these all is exemplified, a part may be omitted.

Note that the recording medium PROD_A5 may record videos which are not coded, or may record videos coded in a coding scheme for recording different than a coding scheme for transmission. In the latter case, a decoding unit (not illustrated) to decode coded data read from the recording medium PROD_A5 according to a coding scheme for recording may be interleaved between the recording medium PROD_A5 and the encoder PROD_A1.

FIG. 2(b) is a block diagram illustrating a configuration of a receiving apparatus PROD_B installed with the video decoding apparatus 31. As illustrated in FIG. 2(b), the receiving apparatus PROD_B includes a receiver PROD_B1 which receives modulation signals, a demodulation unit PROD_B2 which obtains coded data by demodulating the modulation signals received by the receiver PROD_B1, and a decoding unit PROD_B3 which obtains videos by decoding the coded data obtained by the demodulation unit PROD_B2. The above-mentioned video decoding apparatus 31 is utilized as the decoding unit PROD__B3.

The receiving apparatus PROD_B may further include a display PROD_B4 displaying videos, a recording medium PROD_B5 to record the videos, and an output terminal PROD_B6 to output videos outside, as supply destination of the videos output by the decoding unit PROD_B3. In FIG. 2(b), although the configuration that the receiving apparatus PROD_B includes these all is exemplified, a part may be omitted.

Note that the recording medium PROD_B5 may record videos which are not coded, or may record videos which are coded in a coding scheme for recording different from a coding scheme for transmission. In the latter case, an encoder (not illustrated) to code videos acquired from the decoding unit PROD_B3 according to a coding scheme for recording may be interleaved between the decoding unit PROD_B3 and the recording medium PROD_B5.

Note that the transmission medium transmitting modulation signals may be wireless or may be wired. The transmission aspect to transmit modulation signals may be broadcasting (here, referred to as the transmission aspect where the transmission target is not specified beforehand) or may be telecommunication (here, referred to as the transmission aspect that the transmission target is specified beforehand). Thus, the transmission of the modulation signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of the transmitting apparatus PROD_A/receiving apparatus PROD_B transmitting and/or receiving modulation signals in radio broadcasting. Broadcasting stations (broadcasting equipment, and the like)/receiving stations (television receivers, and the like) of cable television broadcasting are an example of the transmitting apparatus PROD_A/receiving apparatus PROD_B transmitting and/or receiving modulation signals in cable broadcasting.

Servers (work stations, and the like)/clients (television receivers, personal computers, smartphones, and the like) for Video On Demand (VOD) services, video hosting services using the Internet and the like are an example of the transmitting apparatus PROD_A/receiving apparatus PROD_B transmitting and/or receiving modulation signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multi-functional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmitting apparatus PROD_A and the receiving apparatus PROD_B.

Figure 3:
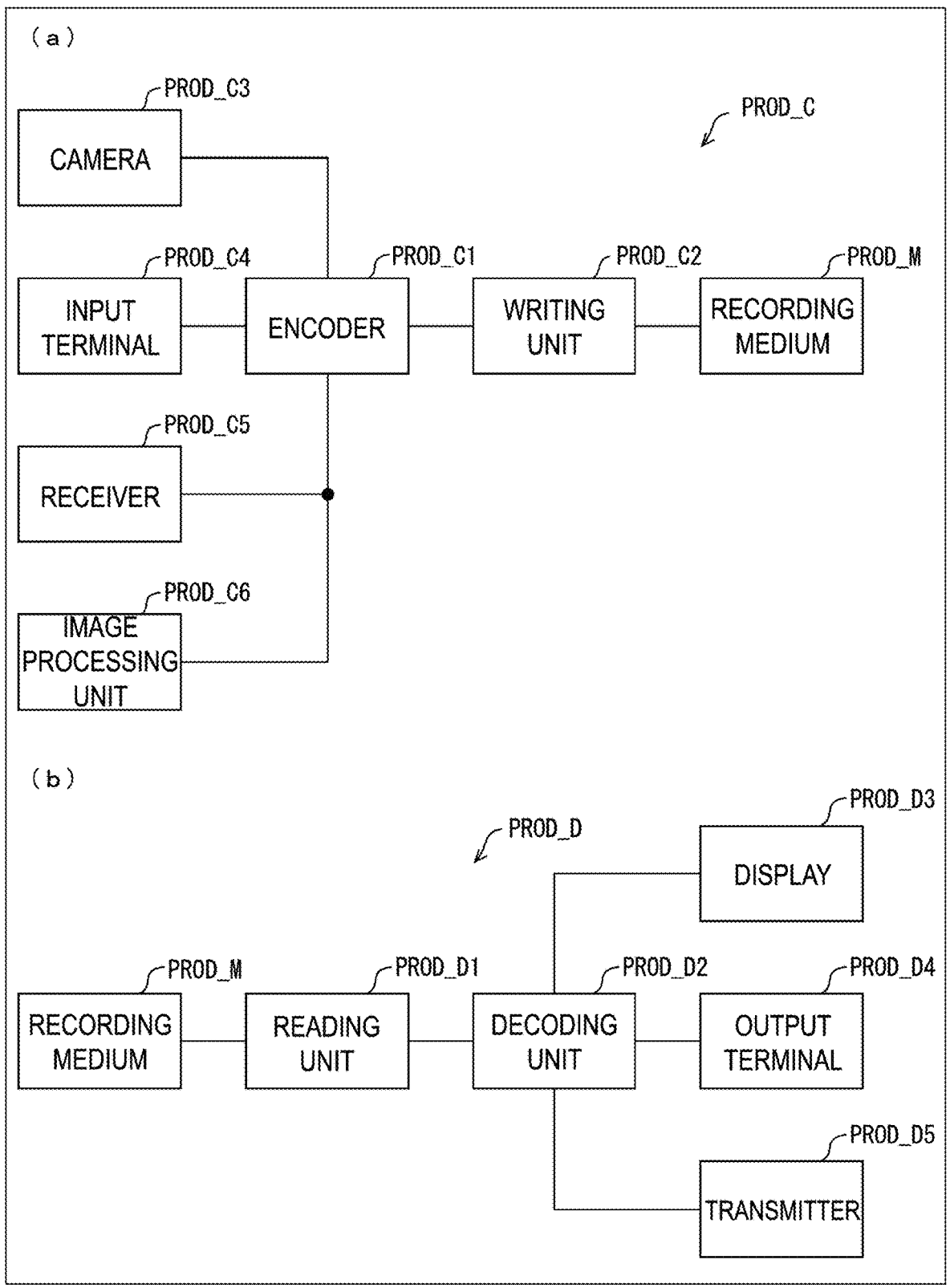
FIG. 3 is a diagram illustrating a configuration of a recording apparatus equipped with the video coding apparatus and a regeneration apparatus equipped with the video decoding apparatus according to the present embodiment. (a) illustrates the recording apparatus equipped with the video coding apparatus, and (b) illustrates the regeneration apparatus equipped with the video decoding apparatus.

Next, referring to FIG. 3, it will be described that the above-mentioned video coding apparatus 11 and the video decoding apparatus 31 can be utilized for recording and regeneration of videos.

FIG. 3(a) is a block diagram illustrating a configuration of a recording apparatus PROD_C installed with the above-mentioned video coding apparatus 11. As illustrated in FIG. 3(a), the recording apparatus PROD_C includes an encoder PROD_C1 which obtains coded data by coding a video, and a writing unit PROD__C2 which writes the coded data obtained by the encoder PROD_C1 in a recording medium PROD_M. The above-mentioned video coding apparatus 11 is utilized as the encoder PROD_C1.

Note that the recording medium PROD_M may be (1) a type built in the recording apparatus PROD_C such as Hard Disk Drive (HDD) or Solid State Drive (SSD), may be (2) a type connected to the recording apparatus PROD_C such as an SD memory card or a Universal Serial Bus (USB) flash memory, and may be (3) a type loaded in a drive apparatus (not illustrated) built in the recording apparatus PROD_C such as Digital Versatile Disc (DVD: trade name) or Blu-ray Disc (BD: trade name).

The recording apparatus PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the encoder PROD_C1. In FIG. 3(a), although the configuration that the recording apparatus PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoding unit (not illustrated) for transmission to decode coded data coded in a coding scheme for transmission may be interleaved between the receiver PROD_C5 and the encoder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording apparatus PROD_C.

FIG. 3(b) is a block diagram illustrating a configuration of a regeneration apparatus PROD_D installed with the above-mentioned video decoding apparatus 31. As illustrated in FIG. 3(b), the regeneration apparatus PROD_D includes a reading unit PROD_D1 which reads coded data written in the recording medium PROD_M, and a decoding unit PROD_D2 which obtains a video by decoding the coded data read by the reading unit PROD_D1. The above-mentioned video decoding apparatus 31 is utilized as the decoding unit PROD_D2.

Note that the recording medium PROD_M may be (1) a type built in the regeneration apparatus PROD_D such as HDD or SSD, may be (2) a type connected to the regeneration apparatus PROD_D such as an SD memory card or a USB flash memory, and may be (3) a type loaded in a drive apparatus (not illustrated) built in the regeneration apparatus PROD_D such as DVD or BD.

The regeneration apparatus PROD_D may further include a display PROD_D3 displaying a video, an output terminal PROD_D4 to output the video to the outside, and a transmitter PROD_D5 which transmits the video, as the supply destination of the video output by the decoding unit PROD_D2. In FIG. 3(b), although the configuration that the regeneration apparatus PROD_D includes these all is exemplified, a part may be omitted.

Note that the transmitter PROD_D5 may transmit a video which is not coded, or may transmit, coded data coded in a coding scheme for transmission different than a coding scheme for recording. In the latter case, an encoder (not illustrated) to code a video in a coding scheme for transmission may be interleaved between the decoding unit PROD_D2 and the transmitter PROD_D5.

Examples of such regeneration apparatus PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration apparatus PROD_D.

Realization as Hardware and Realization as Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. The purpose of the embodiments of the disclosure can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or an MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured connectably with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network. Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BluTooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the disclosure can be also realized in the form of computer data signals embedded in a carrier wave where the program code is embodied by electronic transmission.

The embodiments of the disclosure are not limited to the above-mentioned embodiments, and various modifications are possible within the scope of the claims. Thus, embodiments obtained by combining technical means modified appropriately within the scope defined by claims are induced in the technical scope of the disclosure.

INDUSTRIAL APPLICABILITY

The embodiments of the disclosure can be preferably applied to a video decoding apparatus to decode coded data where graphics data is coded, and a video coding apparatus to generate coded data where graphics data is coded. The embodiments of the disclosure can be preferably applied to a data structure of coded data generated by the video coding apparatus and referred to by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image decoding apparatus comprising:
a decoding circuit configured to decode coded data into a decoded image and segmentation metadata;
a segmentation metadata decoding circuit configured to generate segmentation information with reference to the segmentation metadata resulting from decoding by the decoding circuit; and
an image processing circuit configured to perform prescribed image processing on the decoded image with reference to the segmentation information,
wherein the segmentation metadata decoding circuit includes an autodecoder configured to generate the segmentation information by operating on the segmentation metadata.

2. The image decoding apparatus according to claim 1, wherein the segmentation metadata decoding circuit further includes
a decoded image segmentation circuit configured to generate a segmented decoded image by performing segmentation processing on the decoded image,
an autoencoder configured to operate on the segmented decoded image,
an addition circuit configured to add the segmentation metadata and output data of the autoencoder, and
the autodecoder configured to generate the segmentation information by operating on output data of the addition circuit.

3. The image decoding apparatus according to claim 1, wherein the segmentation metadata decoding circuit further includes
a decoded image segmentation circuit configured to generate a segmented decoded image by performing segmentation processing on the decoded image, and
an addition circuit configured to generate the segmentation information by adding the segmented decoded image and output data of the autodecoder.

* * * * *